(12) United States Patent
Yasuda et al.

(10) Patent No.: US 10,698,644 B2
(45) Date of Patent: Jun. 30, 2020

(54) INFORMATION PROCESSING SYSTEM FOR COLLECTING AND LINKING LOG INFORMATION OF MULTIPLE WORKFLOWS

(71) Applicants: Tohta Yasuda, Kanagawa (JP); Yuuta Saitoh, Tokyo (JP)

(72) Inventors: Tohta Yasuda, Kanagawa (JP); Yuuta Saitoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/351,575

(22) Filed: Mar. 13, 2019

(65) Prior Publication Data

US 2019/0286401 A1    Sep. 19, 2019

(30) Foreign Application Priority Data

Mar. 16, 2018    (JP) ................................. 2018-049927

(51) Int. Cl.
*G06F 3/12* (2006.01)

(52) U.S. Cl.
CPC .......... *G06F 3/1275* (2013.01); *G06F 3/1203* (2013.01); *G06F 3/1273* (2013.01)

(58) Field of Classification Search
None
See application file for complete search history.

(56) References Cited

U.S. PATENT DOCUMENTS

| 2014/0247462 A1 | 9/2014 | Saitoh et al. |
| 2015/0356761 A1 | 12/2015 | Saitoh et al. |
| 2016/0274824 A1* | 9/2016 | Sasaki ................ H04N 1/00344 |
| 2018/0107956 A1* | 4/2018 | Yamada ............ G06Q 10/0633 |

FOREIGN PATENT DOCUMENTS

JP    2016-178565    10/2016

* cited by examiner

*Primary Examiner* — Andrew H Lam
(74) *Attorney, Agent, or Firm* — Oblon, McClelland, Maier & Neustadt, L.L.P.

(57) ABSTRACT

An information processing system includes: a first information processing apparatus connected to a first network and executing a first workflow; a second information processing apparatus connected to a second network and executing a second workflow; and a third information processing apparatus executing the second workflow in cooperation with the second information processing apparatus. The information processing system includes circuitry. The circuitry stores, in the first information processing apparatus, log information of the first workflow and log information of the second workflow. The circuitry stores, in the second information processing apparatus, the log information of the second workflow. The circuitry displays a log information display screen on the second information processing apparatus, the log information display screen being generated by using at least one of the log information of the second workflow and a pair of the log information of the first workflow and the log information of the second workflow.

8 Claims, 19 Drawing Sheets

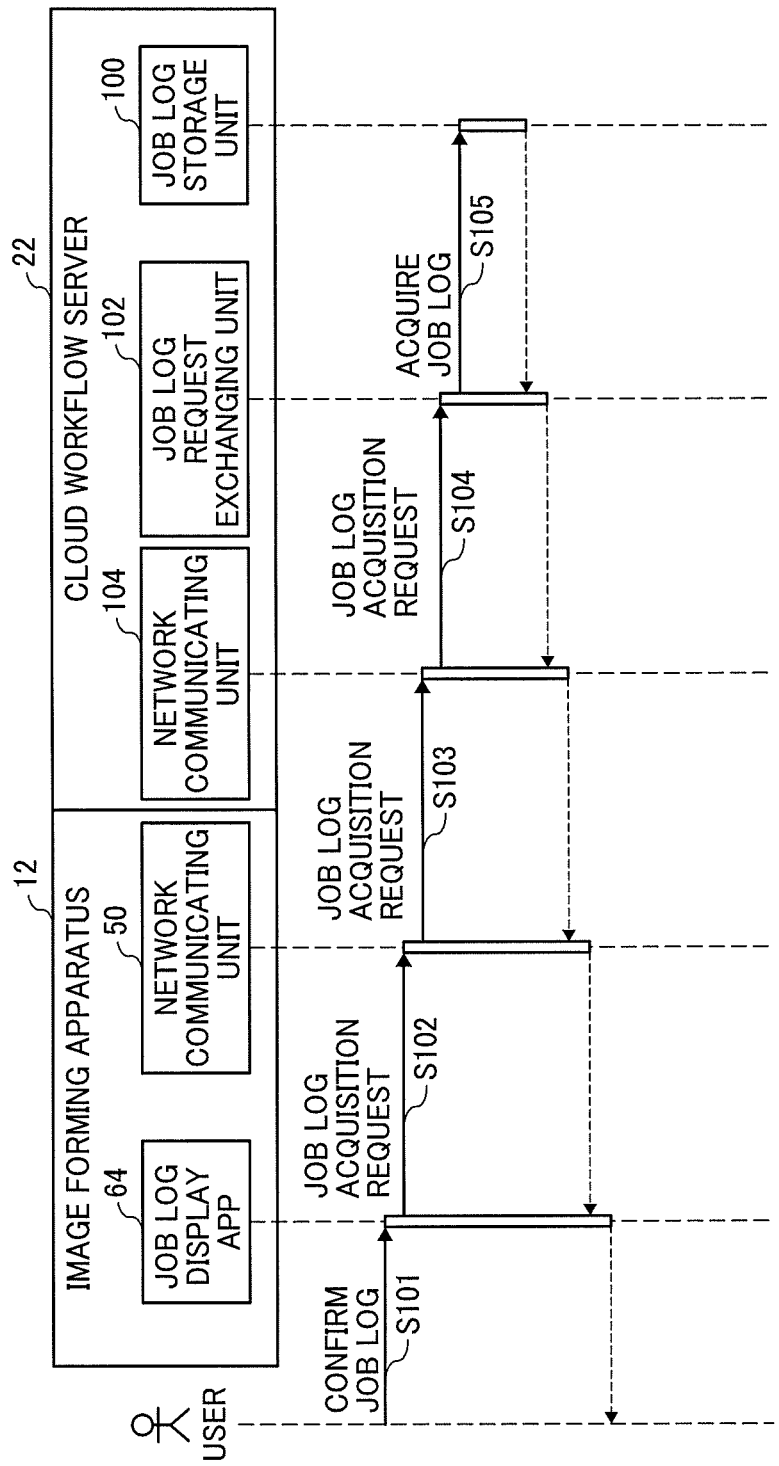

FIG. 8

| LARGE CATEGORY | ITEM NAME | | VALUE |
|---|---|---|---|
| JOB INFORMATION | ID | | 1111 |
| | START DATE AND TIME | | 2018/1/1 0:00 |
| | COMPLETION DATE AND TIME | | 2018/1/1 0:10 |
| | WORKFLOW ID | | 9999 |
| | WORKFLOW NAME | | Scan-stamp-ocr-upload-flow |
| | WORKFLOW TYPE | | Cloud |
| | APP ID | | 8888 |
| | APP NAME | | App1 |
| | STATUS | | Error |
| | JOB DETAIL INFORMATION 1 | JOB DETAIL NAME | STAMP PROCESSING |
| | | STAMP TYPE | QR |
| | | STATUS | completed |
| | JOB DETAIL INFORMATION 2 | JOB DETAIL NAME | OCR PROCESSING |
| | | STAMP TYPE | PDF |
| | | STATUS | completed |
| | JOB DETAIL INFORMATION 3 | JOB DETAIL NAME | EXTERNAL CLOUD SERVER DISTRIBUTION |
| | | DISTRIBUTION DESTINATION | CloudServiceA |
| | | STATUS | Error |
| APPARATUS INFORMATION | APPARATUS NUMBER | | 1111 |
| | BROWSER NAME | | BrowserA |
| ERROR INFORMATION | HTTP STATUS | | 500 |
| | MESSAGE ID | | EXTERNAL SERVER ERROR |
| | ERROR DETAIL MESSAGE | | NONE |
| USER INFORMATION | USER ID | | 1234 |
| | USER NAME | | UserA |
| | GROUP ID | | 5678 |
| | GROUP NAME | | groupB |
| SCANNING JOB INFORMATION | SCANNING COLOR | | FullColor |
| | DOCUMENT SIZE | | A4 |
| PRINTING JOB INFORMATION | PRINTING COLOR | | NONE |
| | PAPER SIZE | | NONE |

FIG. 9A

|  |  |  | USER NAME: User A |
|---|---|---|---|
| APP NAME | START TIME | END TIME | STATUS |
| App1 | 2018/01/01 0:00 | 2018/01/01 0:10 | ERROR |
| App2 | 2018/01/02 0:10 | 2018/01/02 0:20 | COMPLETED |
| App3 | 2018/02/01 0:00 | 2018/02/01 0:10 | IN EXECUTION |

USER NAME: User A

APP NAME: App1
START TIME: 2018/01/01 0:00
END TIME: 2018/01/01 0:10
STATUS: ERROR
CAUSE OF ERROR: DISTRIBUTION FAILED

DETAILED STATUS:

| STAMP PROCESSING | COMPLETED |
|---|---|
| OCR CONVERSION | COMPLETED |
| DISTRIBUTION | ERROR |

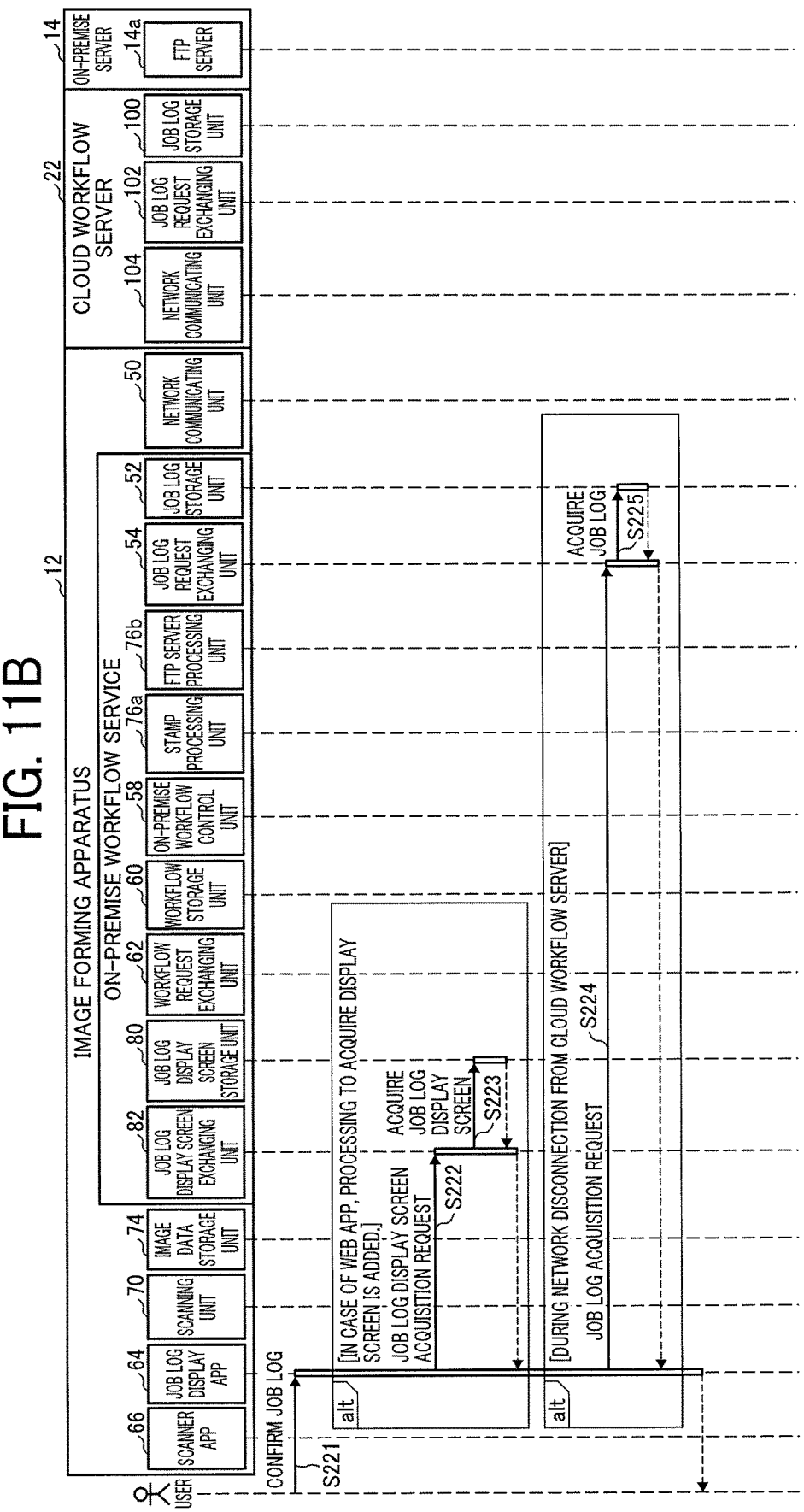

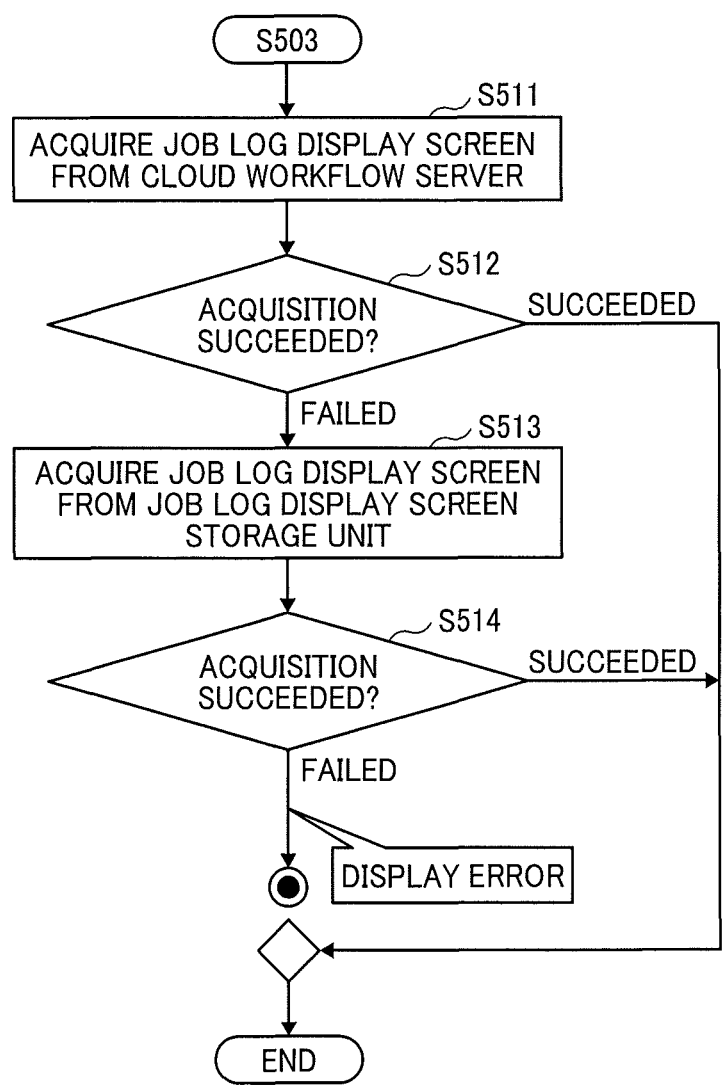

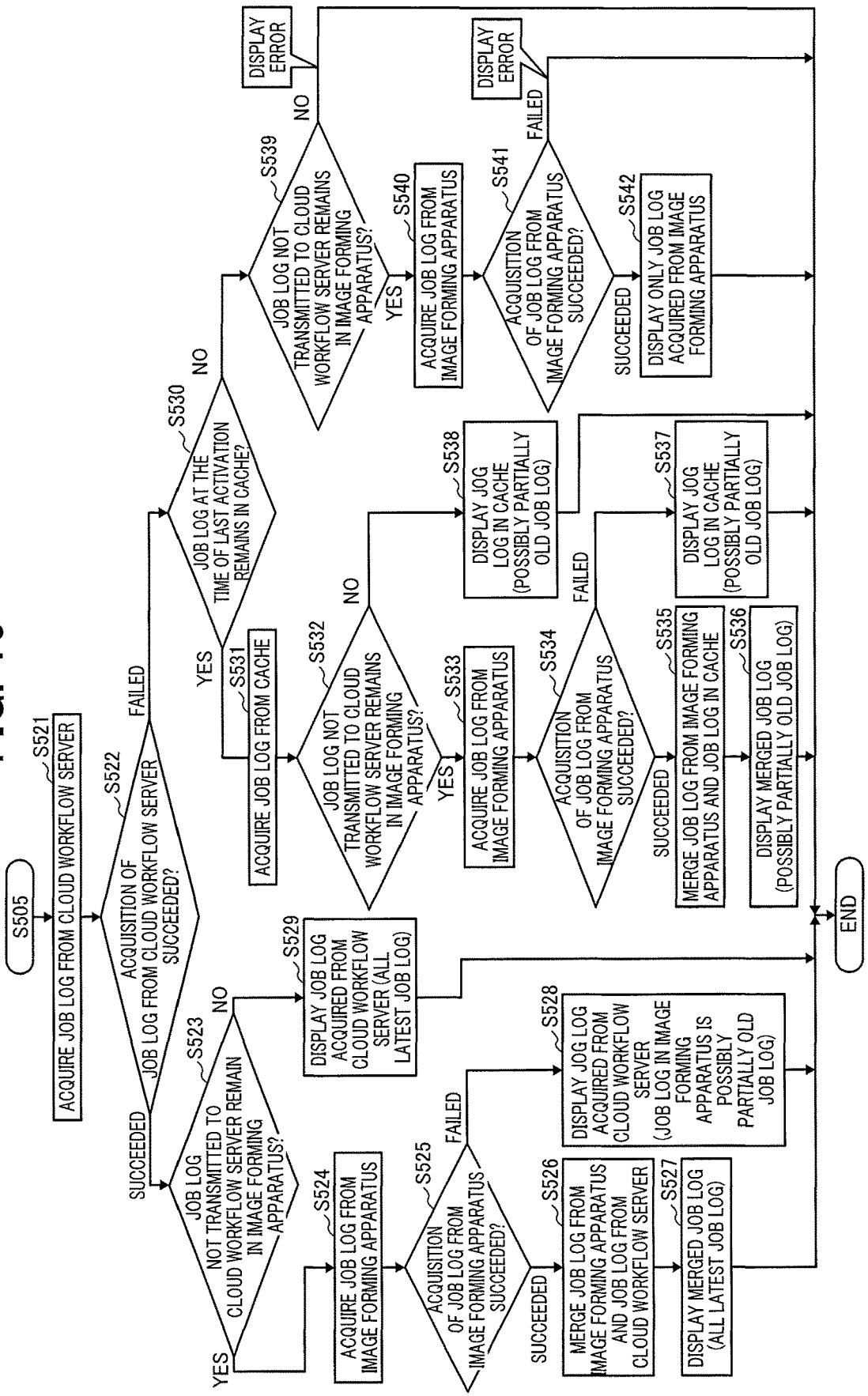

INFORMATION PROCESSING SYSTEM FOR COLLECTING AND LINKING LOG INFORMATION OF MULTIPLE WORKFLOWS

CROSS-REFERENCE TO RELATED APPLICATION

This patent application is based on and claims priority pursuant to 35 U.S.C. § 119(a) to Japanese Patent Application No. 2018-049927, filed on Mar. 16, 2018, in the Japan Patent Office, the entire disclosure of which is hereby incorporated by reference herein.

BACKGROUND

Technical Field

The present disclosure relates to an information processing system, an information processing apparatus, and a non-transitory computer-storage medium.

Description of the Related Art

For example, there is a technique of collecting and linking logs of jobs performed by a plurality of image forming apparatuses to an image forming apparatus as a control source of a cooperative operation, so as to manage the jobs of the cooperative operation. In such a conventional technique, a cooperation system has conventionally been known. The cooperation system can manage the jobs of the cooperative operation even in the case where devices, each of which is configured that an operation unit and a main unit are made to operate independently, are cooperatively operated.

In recent years, a workflow is registered in and executed by an information processing system in a user environment such as on-premises system. In addition, for example, a workflow is registered in and executed by an information processing system in a service provision environment such as the Internet, which is different from the user environment. Log information of the workflow executed in such different environments is separately managed in the respective environment.

SUMMARY

According to an embodiment, an information processing system is provided that includes: a first information processing apparatus connected to a first network and executing a first workflow; a second information processing apparatus connected to a second network and executing a second workflow that is different from the first workflow, the second network being different from the first network; and a third information processing apparatus connected to the second network and executing the second workflow in cooperation with the second information processing apparatus. The information processing system includes circuitry. The circuitry stores, in a first memory of the first information processing apparatus, log information of the first workflow executed by the first information processing apparatus and log information of the second workflow executed by the second information processing apparatus and the third information processing apparatus, the log information of the second workflow being transmitted from the second information processing apparatus. The circuitry stores, in a second memory of the second information processing apparatus, the log information of the second workflow executed by the second information processing apparatus and the third information processing apparatus. The circuitry displays a log information display screen on the second information processing apparatus, the log information display screen being generated by using at least one of the log information of the second workflow stored in the second memory of the second information processing apparatus and a pair of the log information of the first workflow and the log information of the second workflow stored in the first memory of the first information processing apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is a sequence chart of an example of processing to confirm a job log according to the embodiments of the present disclosure;

FIG. 8 is a configuration table of an example of the job log according to the embodiments of the present disclosure;

FIG. 9A and FIG. 9B are illustartions of an example of screens displayed by a job log display application according to the embodiments of the present disclosure;

FIG. 11B is a sequence chart (2/2) of the example of the workflow executed in the information processing system according to the second embodiment of the present disclosure;

FIG. 15 is a flowchart of an example of screen data acquisition processing according to the embodiments of the present disclosure; and FIG. 16 is a flowchart of an example of job log acquisition display processing according to the embodiments of the present disclosure.

Figure 1:
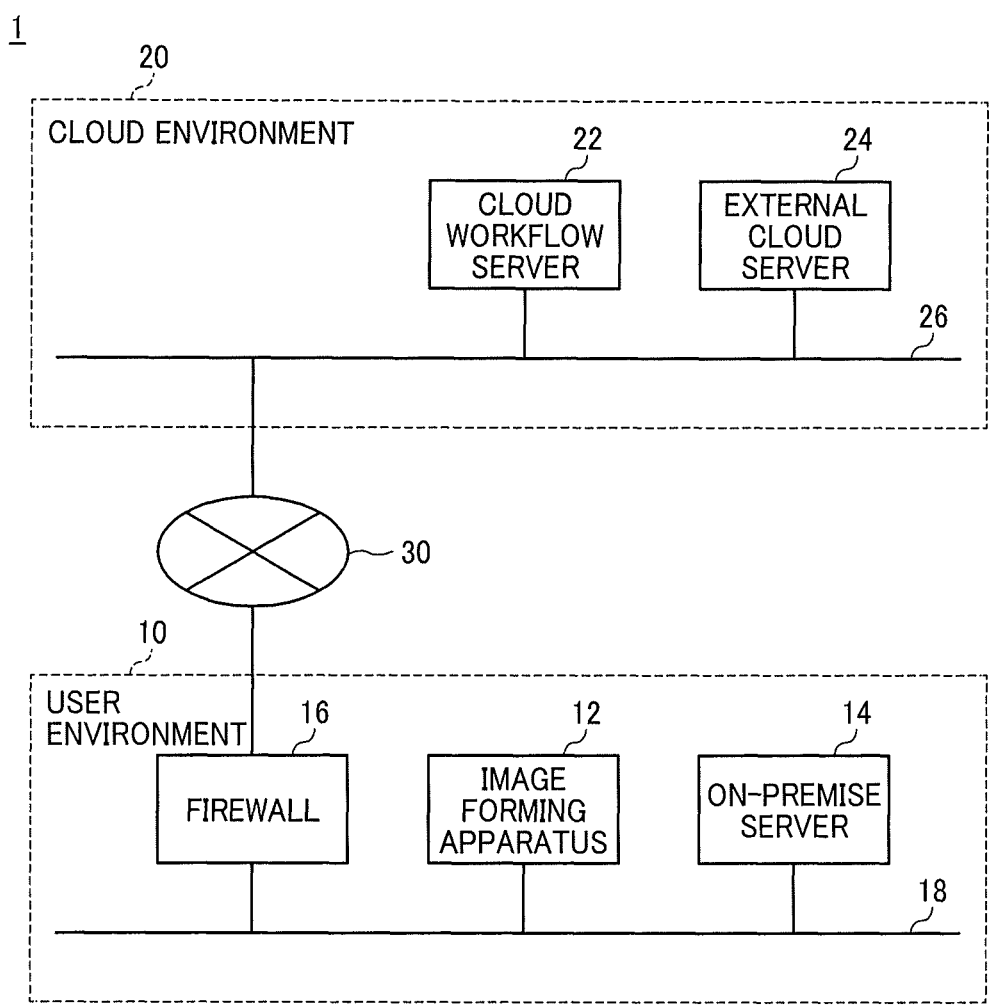
FIG. 1 is a configuration diagram of an example of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A description is given hereinafter of embodiments of the present disclosure with reference to the drawings.

First Embodiment

System Configuration

A description is given of a system configuration of an information processing system 1 according to the present embodiment with reference to FIG. 1. FIG. 1 is a block diagram illustrating an example of a configuration of the information processing system 1 according to the present embodiment.

In the information processing system 1 illustrated in FIG. 1, a user environment 10 and a cloud environment 20 are communicably connected to each other via a network 30 such as the Internet. The information processing system 1 executes a workflow in which a plurality of types of processing is executed by a device in at least one of the user environment 10 and the cloud environment 20. The cloud environment 20, which is an example of a service provision environment, includes a cloud workflow server 22 and an external cloud server 24. The cloud workflow server 22 and the external cloud server 24 are connected to the network 30 via a network 26 inside the cloud environment 20.

The cloud workflow server 22 executes the workflow in the cloud environment 20 as will be described later. The external cloud server 24 is an example of an information processing apparatus that provides a cloud service, such as an online storage service used as a file acquisition source, a file transmission destination, and the like.

The user environment 10 in FIG. 1 includes an image forming apparatus 12, an on-premise server 14, and a firewall 16. The image forming apparatus 12 and the on-premise server 14 in FIG. 1 are connected to the network 30 via a network 18 inside the user environment 10 and the firewall 16. The image forming apparatus 12 is an example of an electronic apparatus. The image forming apparatus 12 is also an example of the information processing apparatus. The image forming apparatus 12 executes the workflow in the user environment 10, which will be described later.

The workflow in the user environment 10 may be implemented by an information processing apparatus other than the image forming apparatus 12 connected to the network 18. The workflow in the user environment 10 links with the on-premise server 14 and the cloud workflow server 22, which will be described later. The on-premise server 14 is an example of the information processing apparatus such as a File Transfer Protocol (FTP) server or a Server Message Block (SMB) server used as the file acquisition source, the file transmission destination, and the like.

The configuration of the information processing system 1 is not limited to the configuration illustrated in FIG. 1. For example, the user environment 10 can include the electronic apparatus such as a scanner, a printer, a facsimile machine, a projector, or an electronic whiteboard in addition to the image forming apparatus 12. The electronic apparatuses such as the image forming apparatus 12, the scanner, the printer, the facsimile machine, the projector, and the electronic whiteboard are examples of the electronic apparatus that executes the workflow.

FIG. 1 illustrates the example in which the single image forming apparatus 12, the single on-premise server 14, the single cloud workflow server 22, and the single external cloud server 24 are provided. In another example, a plurality of the image forming apparatuses 12, a plurality of the on-premise servers 14, a plurality of the cloud workflow servers 22, and a plurality of the external cloud servers 24 can be provided.

Hardware Configuration

Computer

Figure 2:
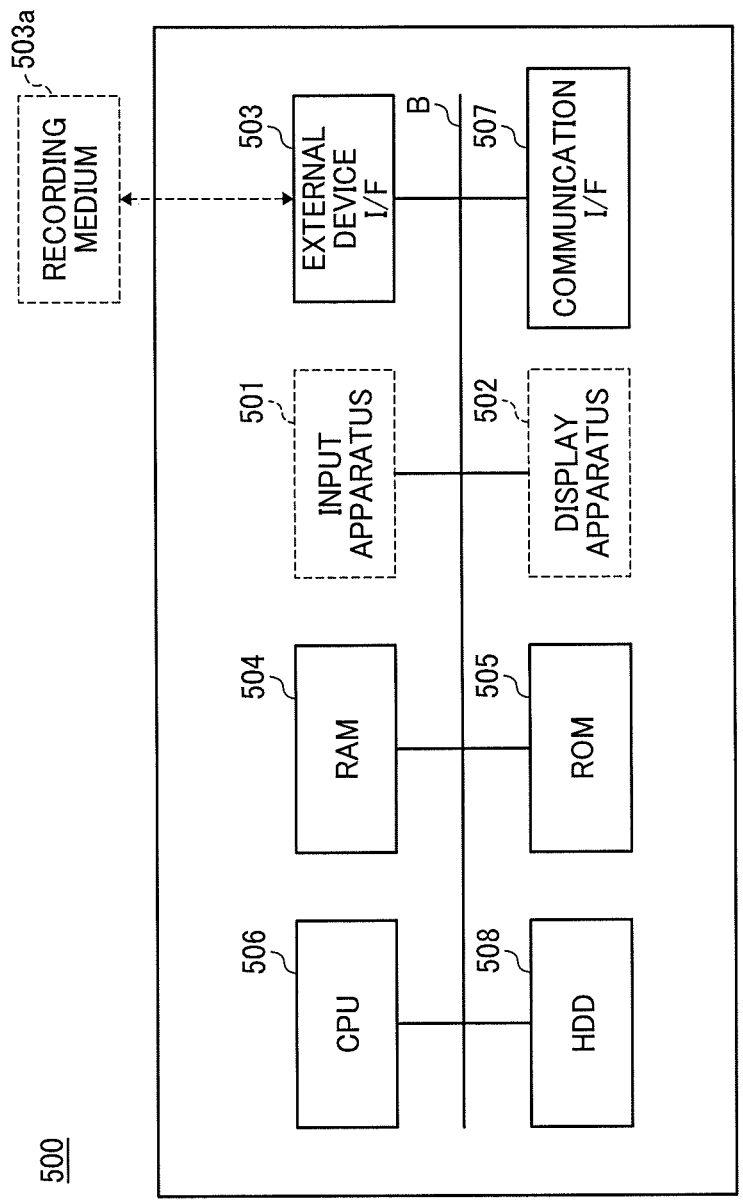
FIG. 2 is a hardware configuration diagram of an example of a computer according to the embodiments of the present disclosure.

The on-premise server 14, the cloud workflow server 22, and the external cloud server 24 are each implemented by a computer 500 having a hardware configuration as illustrated in FIG. 2, for example. FIG. 2 is a block diagram illustrating an example of a hardware configuration of the computer 500 according to the present embodiment.

The computer 500 in FIG. 2 includes an input device 501, a display device 502, an external device interface (I/F) 503, random access memory (RAM) 504, read only memory (ROM) 505, a central processing unit (CPU) 506, a communication I/F 507, a hard disk drive (HDD) 508, and the like, and these components are mutually connected by a bus B. The input device 501 and the display device 502 may be coupled and used when necessary.

The input device 501 includes a keyboard, a mouse, a touchscreen, and the like and is used by a user to input each operation signal. The display device 502 includes a display and the like, and displays a processing result by the computer 500.

The communication IN 507 is an interface that connects the computer 500 to the various networks. As a result, the computer 500 can perform data communication via the communication I/F 507.

The HDD 508 is an example of a non-volatile storage device that stores programs and data. The stored programs and data include: an Operating System (OS) as basic software that controls the entire computer 500; a program that provides various functions on the OS; and the like. Instead of the HDD 508, the computer 500 may use a drive device (for example, a solid-state drive: SSD) that uses flash memory as a storage medium.

The external device I/F 503 is an interface with an external device. The external device includes a recording medium 503a and the like. Thus, the computer 500 can perform at least one of reading and writing of the recording medium 503a via the external device I/F 503. Examples of the recording medium 503a include a flexible disk, a Compact Disk (CD), a Digital Versatile Disk (DVD), a Secure Digital (SD) memory card, and a USB memory stick.

The ROM 505 is an example of non-volatile semiconductor memory (the storage device) that can hold programs and data even when power is turned off. The ROM 505 stores the programs and the data such as a basic input/output program, the OS setting, and network setting that are executed when the computer 500 is activated. The RAM 504 is an example of volatile semiconductor memory (the storage device) that temporarily holds programs and data.

The CPU 506 is an arithmetic unit that reads the programs and the data from the storage devices such as the ROM 505 and the HDD 508 into the RAM 504 and executes processing, so as to implement control and functions of the entire computer 500. The CPU 506 is an arithmetic unit that reads the programs and the data from the storage devices such as the ROM 505 and the HDD 508 and executes processing, so as to implement control and functions of the entire computer 500. With the hardware configuration as illustrated in FIG. 2, for example, the on-premise server 14, the cloud workflow server 22, and the external cloud server 24 in FIG. 1 can implement various types of processing, which will be described later.

Figure 3:
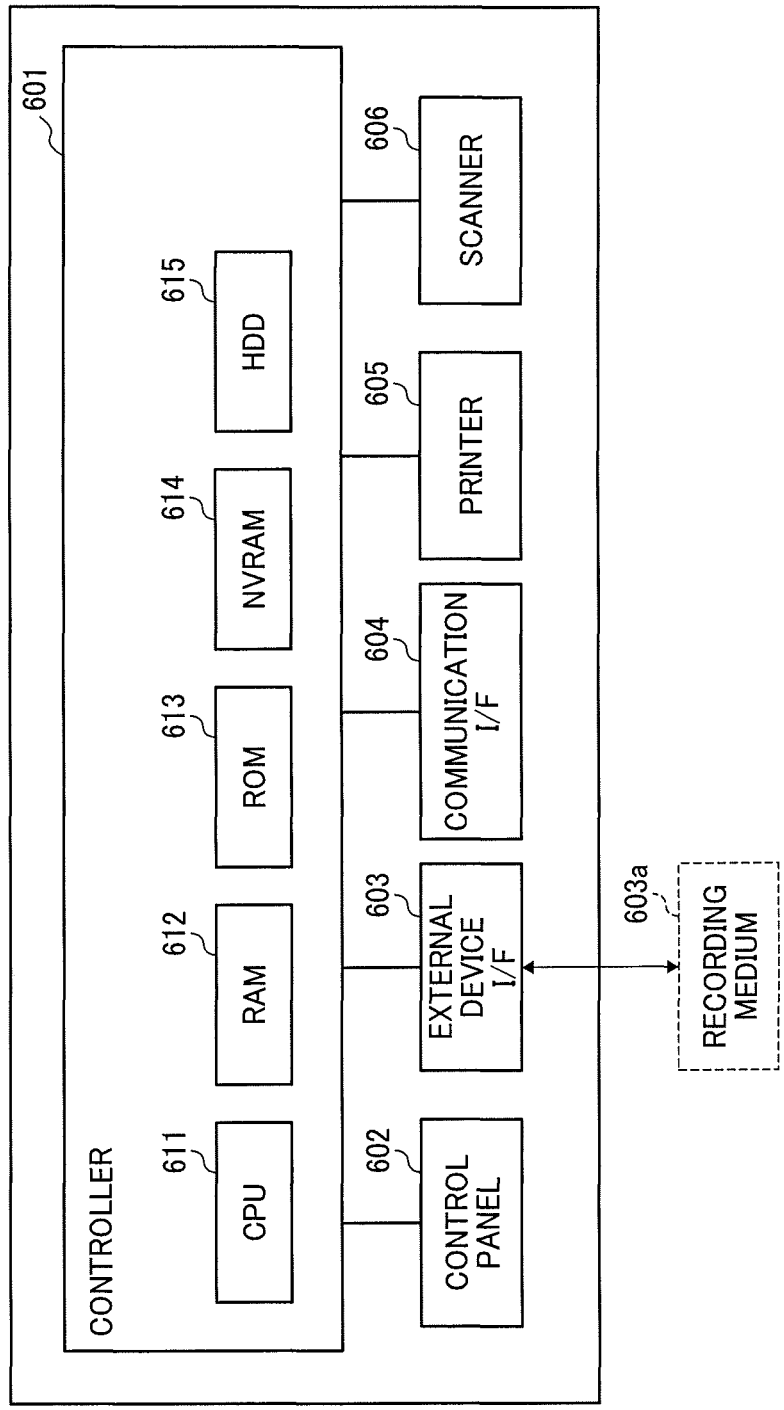
FIG. 3 is a hardware configuration diagram of an example of an image forming apparatus according to the embodiments of the present disclosure.

Image Forming Apparatus 12:

The image forming apparatus 12 in FIG. 1 is implemented by a computer having a hardware configuration as illustrated in FIG. 3, for example. FIG. 3 is block diagram illustrating example of a hardware configuration of the image forming apparatus 12 according to the present embodiment. The image forming apparatus 12 in FIG. 3 includes a controller 601, a control panel 602, an external device I/F 603, a communication I/F 604, a printer 605, a scanner 606, and the like.

The controller 601 includes a CPU 611, RAM 612, ROM 613, non-volatile (NV) RAM 614, an HDD 615, and the like. The ROM 613 stores various programs and data. The RAM 612 temporarily holds programs and data. The NVRAM 614 stores setting information and the like, for example. The HDD 615 stores various programs and data.

The CPU 611 reads the programs, the data, the setting information, and the like from the ROM 613, the NVRAM 614, the HDD 615, and the like into the RAM 612 and executes processing, so as to implement control and functions of the entire image forming apparatus 12.

The control panel 602 includes: an input unit that accepts input from the user; and a display unit that performs display. The external device I/F 603 is an interface with the external device. An example of the external device is a recording medium 603a. Thus, the image forming apparatus 12 can perform at least one of reading and writing of the recording medium 603a via the external device I/F 603. Examples of the recording medium 603a include an integrated circuit (IC) card, the flexible disk, the CD, the DVD, the SD memory card, and the USB memory stick.

The communication I/F 604 is an interface that connects the image forming apparatus 12 to the network 18. As a result, the image forming apparatus 12 can perform the data communication via the communication I/F 604. The printer 605 is a printing device that prints out print data on paper. The scanner 606 is a reading device that reads image data (electronic data) from a document.

Functional Configuration:

Next, a description is given of a functional configuration of the information processing system 1 according to the present embodiment. In the following description, the workflow in the user environment 10 will be referred to as an on-premise workflow, and the workflow in the cloud environment 20 is will be referred to as a cloud workflow.

Figure 4:
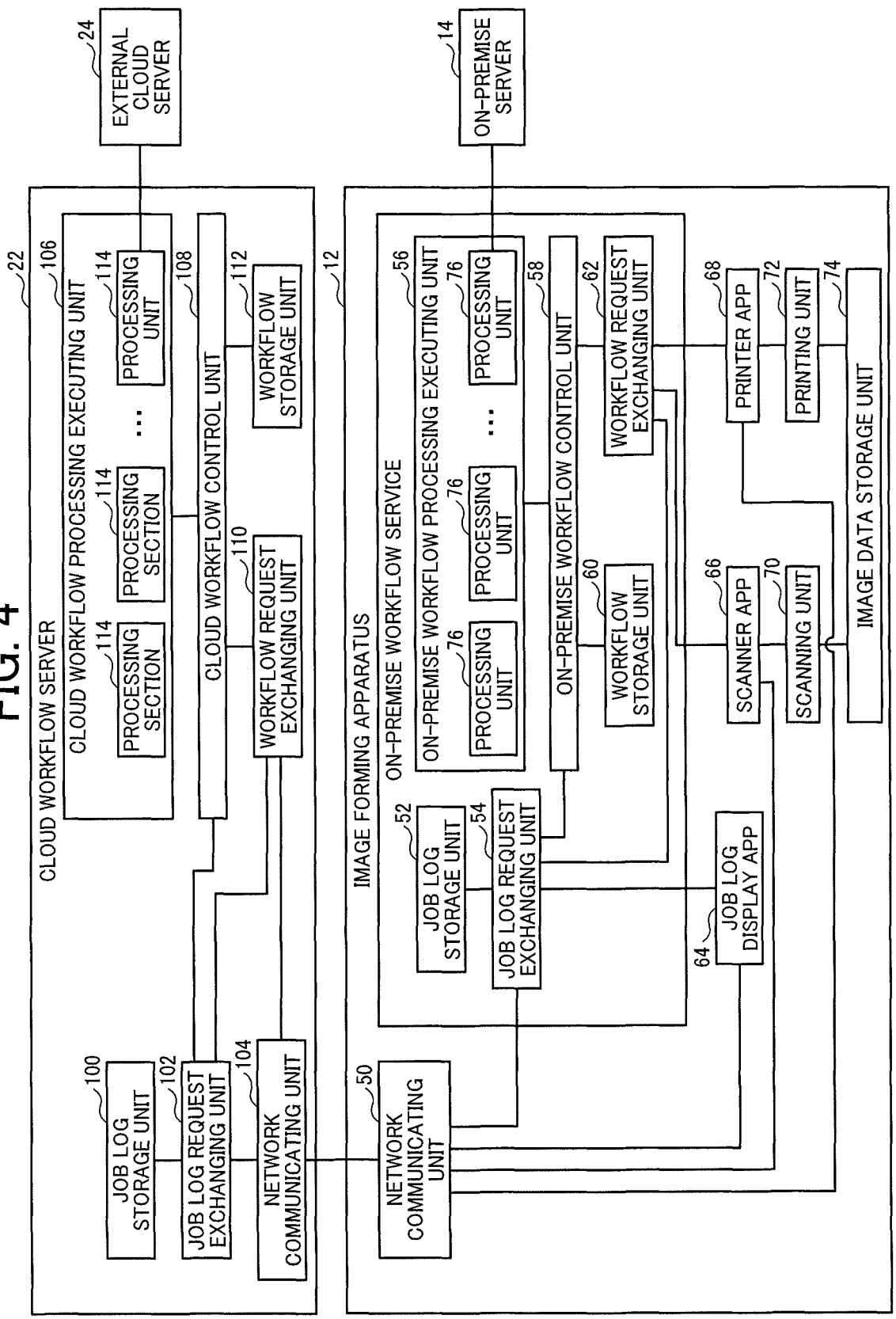
FIG. 4 is a functional configuration diagram of an example of an information processing system according to a first embodiment of the present disclosure.

FIG. 4 is block diagram illustrating an example of a functional configuration of the information processing system 1 according to the first embodiment. The firewall 16 is omitted in the functional configuration diagram of FIG. 4. The image forming apparatus 12 includes a network communicating unit 50, a job log storage unit 52, a job log request exchanging unit 54, an on-premise workflow processing executing unit 56, an on-premise workflow control unit 58, a workflow storage unit 60, and a workflow request exchanging unit 62. The image forming apparatus 12 also includes a job log display application 64, a scanner application 66, a printer application 68, a scanning unit 70, a printing unit 72, and an image data storage unit 74.

The network communicating unit 50 performs network communication with the cloud workflow server 22. The job log storage unit 52 stores information on and a status of execution of the workflow (a job log). The job log request exchanging unit 54 accepts a job log acquisition request and a job log saving request from the cloud workflow server 22. The job log request exchanging unit 54 transmits the job log, for which the acquisition request is accepted, to an acquisition request source, or stores the job log, for which the saving request is accepted, in the job log storage unit 52.

The on-premise workflow processing executing unit 56 includes one or more processing units 76. In accordance with workflow execution control by the on-premise workflow control unit 58, the processing unit 76 executes processing contents in the user environment 10 such as Server Message Block (SMB) transmission processing and FTP transmission processing.

The on-premise workflow control unit 58 sequentially calls the processing units 76 in the on-premise workflow processing executing unit 56 in accordance with workflow information, and controls the execution of the on-premise workflow.

The workflow storage unit 60 stores the workflow information. The workflow request exchanging unit 62 accepts a workflow execution request from at least one of the scanner application 66 and the printer application 68, and transmits a workflow execution result to at least one of the scanner application 66 and the printer application 68 as an execution request source when necessary.

The job log display application 64 is an application for displaying the job log. The job log display application 64 can be either a web application or a native application. The job log display application 64 has a function as a user interface (UI) that accepts the user operation, and has functions of displaying the job log, acquiring the job log of the cloud workflow, acquiring the job log of the on-premise workflow, and the like. In another example, the job log display application 64 can be implemented as a part of the function of at least one of the scanner application 66 and the printer application 68.

The scanner application 66 is an application related to scanning of the document. The scanner application 66 can be either a web application or a native application. The scanner application 66 internally holds an ID of the workflow to be executed. The scanner application 66 has a function as the UI that can be operated by the user, and also has functions of setting a job and executing the job. For example, the scanner application 66 can accept settings of scanner resolution, reading size, colors, and the like, and designation of a start to execute a scanning job from the user.

The printer application 68 is an application related to printing of the document. The printer application can be either a web application or a native application. The printer application 68 internally holds the ID of the workflow to be executed. The printer application 68 has a function as the UI that can be operated by the user, and has functions of setting a job and executing the job. For example, the printer application 68 can accept settings of printing size, the colors, and the like, designation of a start to execute a printing job, and the like from the user.

The scanning unit 70 is implemented by the scanner 606 or the like and scans the document. The printing unit 72 is implemented by the printer 605 or the like and prints the document. The image data storage unit 74 stores the image data. For example, the image data storage unit 74 stores the image data scanned by the scanning unit 70 and the image data printed by the printing unit 72.

The cloud workflow server 22 includes a job log storage unit 100, a job log request exchanging unit 102, a network communicating unit 104, a cloud workflow processing executing unit 106, a cloud workflow control unit 108, a workflow request exchanging unit 110, and a workflow storage unit 112.

The job log storage unit 100 stores the job log. The job log request exchanging unit 102 accepts the job log acquisition request and the job log saving request from the image forming apparatus 12. The job log request exchanging unit 102 transmits the job log, for which the acquisition request is accepted, to the acquisition request source, or stores the job log, for which the saving request is accepted, in the job log storage unit 100. The network communicating unit 104 performs the network communication with the image forming apparatus 12.

The cloud workflow processing executing unit 106 includes one or more processing units 114. In accordance with workflow execution control by the cloud workflow control unit 108, the processing unit 114 executes processing contents in the cloud environment such as optical character recognition (OCR) processing, file conversion processing, and transmission processing to the storage service.

The cloud workflow control unit 108 sequentially calls the processing units 114 in the cloud workflow processing executing unit 106 in accordance with the workflow information, and controls the execution of the cloud workflow. The workflow request exchanging unit 110 accepts a cloud workflow execution request from the image forming apparatus 12, and transmits a cloud workflow execution result to the image forming apparatus 12 as the execution request source. The workflow storage unit 112 stores the workflow information.

Processing Details:

Next, a description is given of details of the processing in the information processing system 1 according to the present embodiment.

Figure 5:
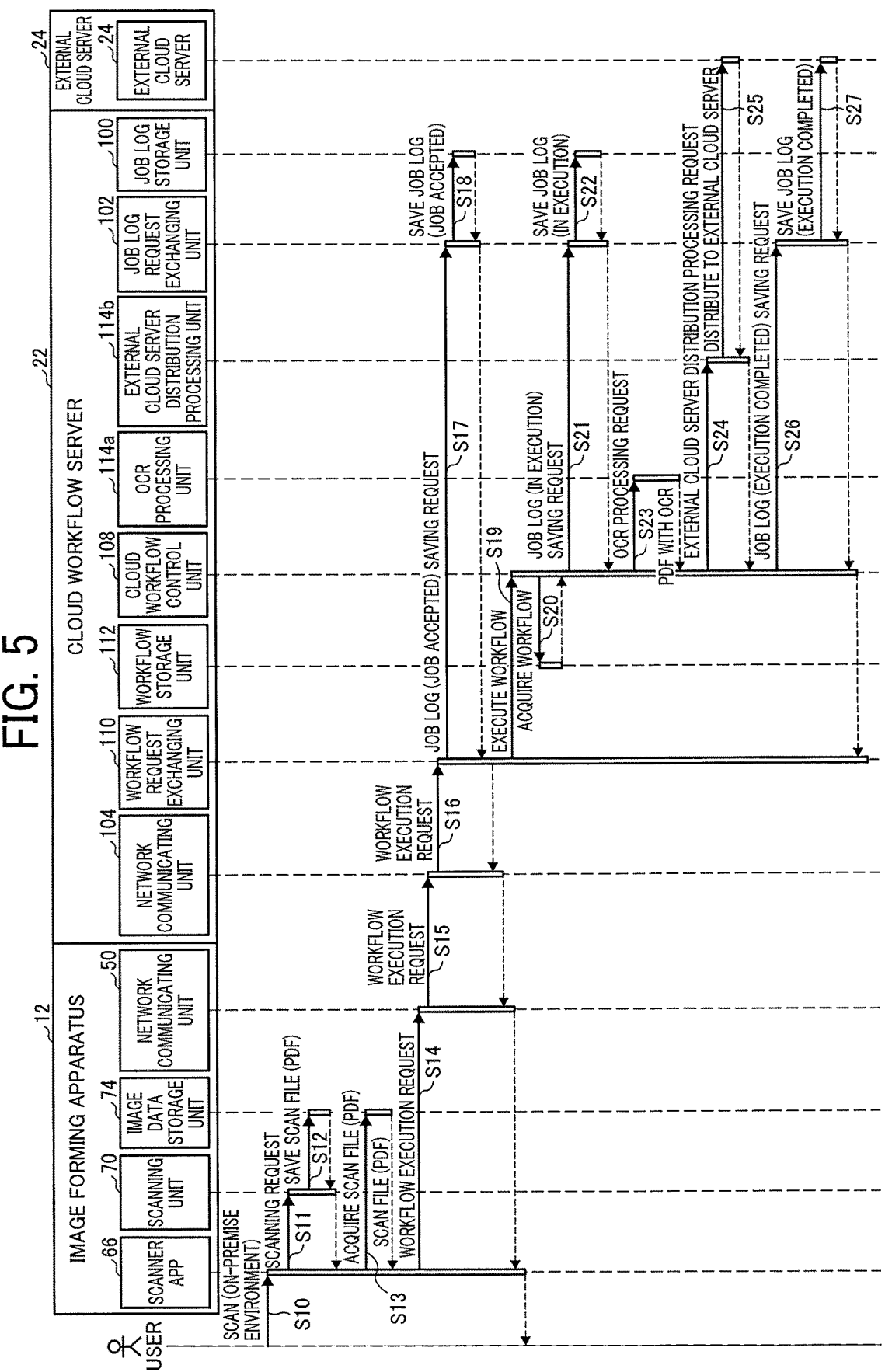
FIG. 5 is a sequence chart of an example of a workflow executed in the information processing system according to the first embodiment of the present disclosure.

Execution of Workflow:

FIG. 5 is a sequence diagram illustrating an example of an operation of executing a workflow by the information processing system 1, according to the first embodiment. FIG. 5 is a sequence diagram of a case where scanned image data (a scan file) is transmitted to the cloud workflow server 22, converted into a Portable Document Format (PDF) file including text as an OCR result, and transmitted to the external cloud server 24.

In step S10, the scanner application 66 accepts a scanning request from a user. The operation proceeds to step S11, and the scanner application 66 requests the scanning unit 70 to scan a document. The scanning unit 70 scans the document. In step S12, the scanning unit 70 stores the scan file in the image data storage unit 74.

The operation proceeds to step S13, and the scanner application 66 acquires the scan file from the image data storage unit 74. In steps S14 to S16, the scanner application 66 transmits the workflow execution request to the workflow request exchanging unit 110 in the cloud workflow server 22. The workflow execution request in steps S14 to S16 includes the scan file, a cloud workflow ID, connection destination information, and a parameter used for the processing.

The operation proceeds to step S17, and the workflow request exchanging unit 110 requests the job log request exchanging unit 102 to save a job log of the execution request (the job) including job information, device information, error information, user information, and scanning job information with designation of a status "job accepted". The operation proceeds to step S18, and the job log request exchanging unit 102 saves the job log, which is requested by the workflow request exchanging unit 110, in the job log storage unit 100.

The operation proceeds to step S19, and the workflow request exchanging unit 110 requests the cloud workflow control unit 108 to execute the workflow. The operation proceeds to step S20, and the cloud workflow control unit 108 acquires the workflow information corresponding to the cloud workflow ID from the workflow storage unit 112.

The operation proceeds to step S21, and the cloud workflow control unit 108 requests the job log request exchanging unit 102 to save a status (in execution) of the job log. In step S22, on the basis of the saving request from the cloud workflow control unit 108, the job log request exchanging unit 102 updates the corresponding status of the job log saved in the job log storage unit 100 to "in execution".

In accordance with the workflow information acquired in step S20, the cloud workflow control unit 108 sequentially processes of the workflow. First, in step S23, the cloud workflow control unit 108 requests OCR processing of the scan file to an OCR processing unit 114a, which is an example of the processing unit 114, and acquires a PDF file including text as the OCR result.

The operation proceeds to step S24, and the cloud workflow control unit 108 requests an external cloud server distribution processing unit 114b, which is another example of the processing unit 114, to distribute the PDF file including text as the OCR result to the external cloud server 24. The operation proceeds to step S25, and the external cloud server distribution processing unit 114b distributes the PDF file including text as the OCR result to the external cloud server 24.

When the job is completed, in step S26, the cloud workflow control unit 108 requests the job log request exchanging unit 102 to save the status (execution completed) of the job log. In step S27, on the basis of the saving request from the cloud workflow control unit 108, the job log request exchanging unit 102 updates the corresponding status of the job log saved in the job log storage unit 100 to "execution completed".

In the case where an error occurs during the workflow processing, the cloud workflow control unit 108 stops the workflow processing and requests the job log request exchanging unit 102 to save the status (error) of the job log and to add the error information. On the basis of the saving request from the cloud workflow control unit 108, the job log request exchanging unit 102 updates the corresponding status of the job log, which is saved in the job log storage unit 100, to "error" and adds the error information.

The job log may be updated for each status of the processing unit 114 in addition to the status of the job (the job accepted, in execution, execution completed, or error). In the case where the information of the job log other than the status is changed dynamically, such information other than the status may be updated or added.

Figure 6A:
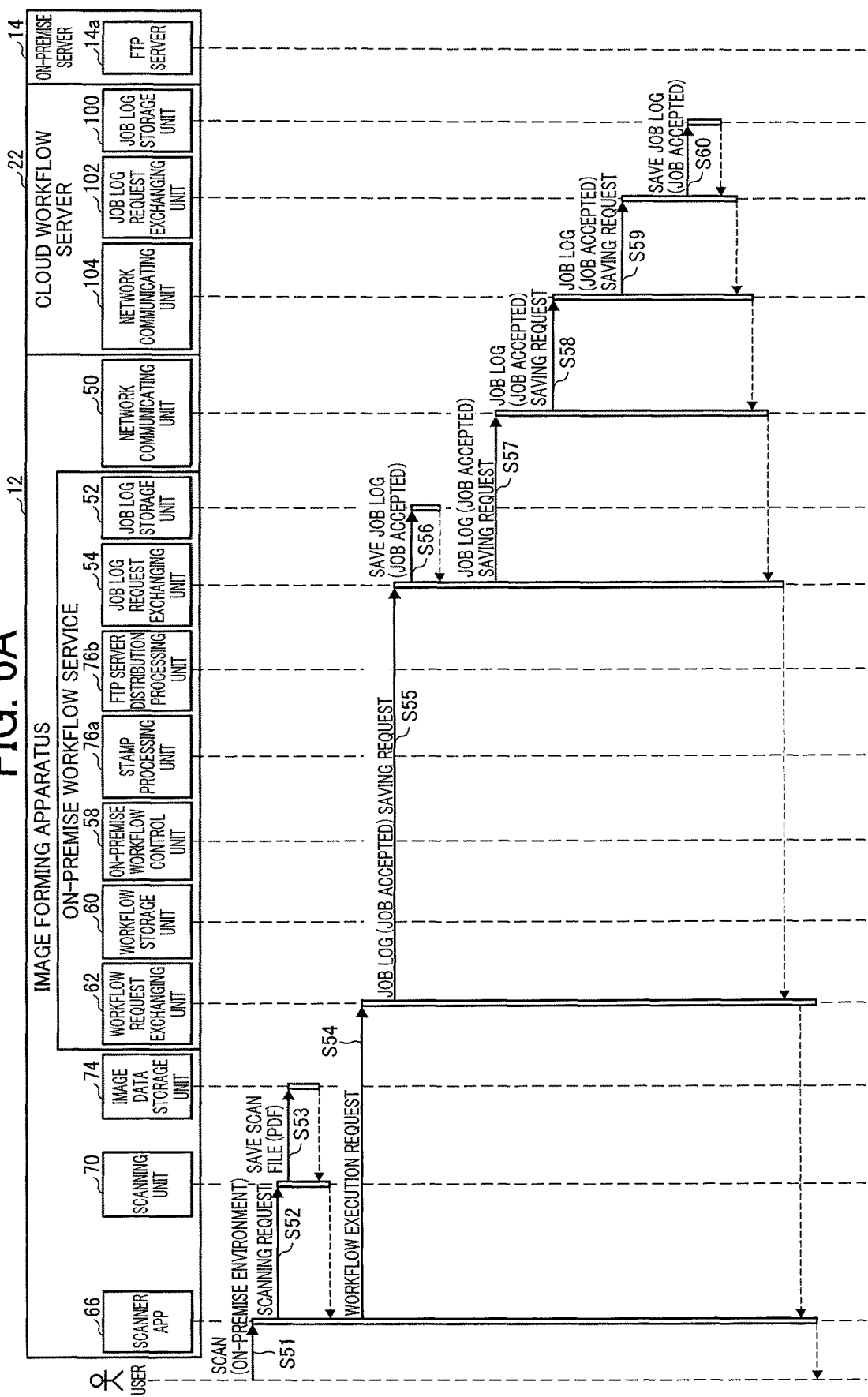
FIG. 6A is a sequence chart (1/2) of another example of the workflow executed in the information processing system according to the first embodiment of the present disclosure.
Figure 6B:
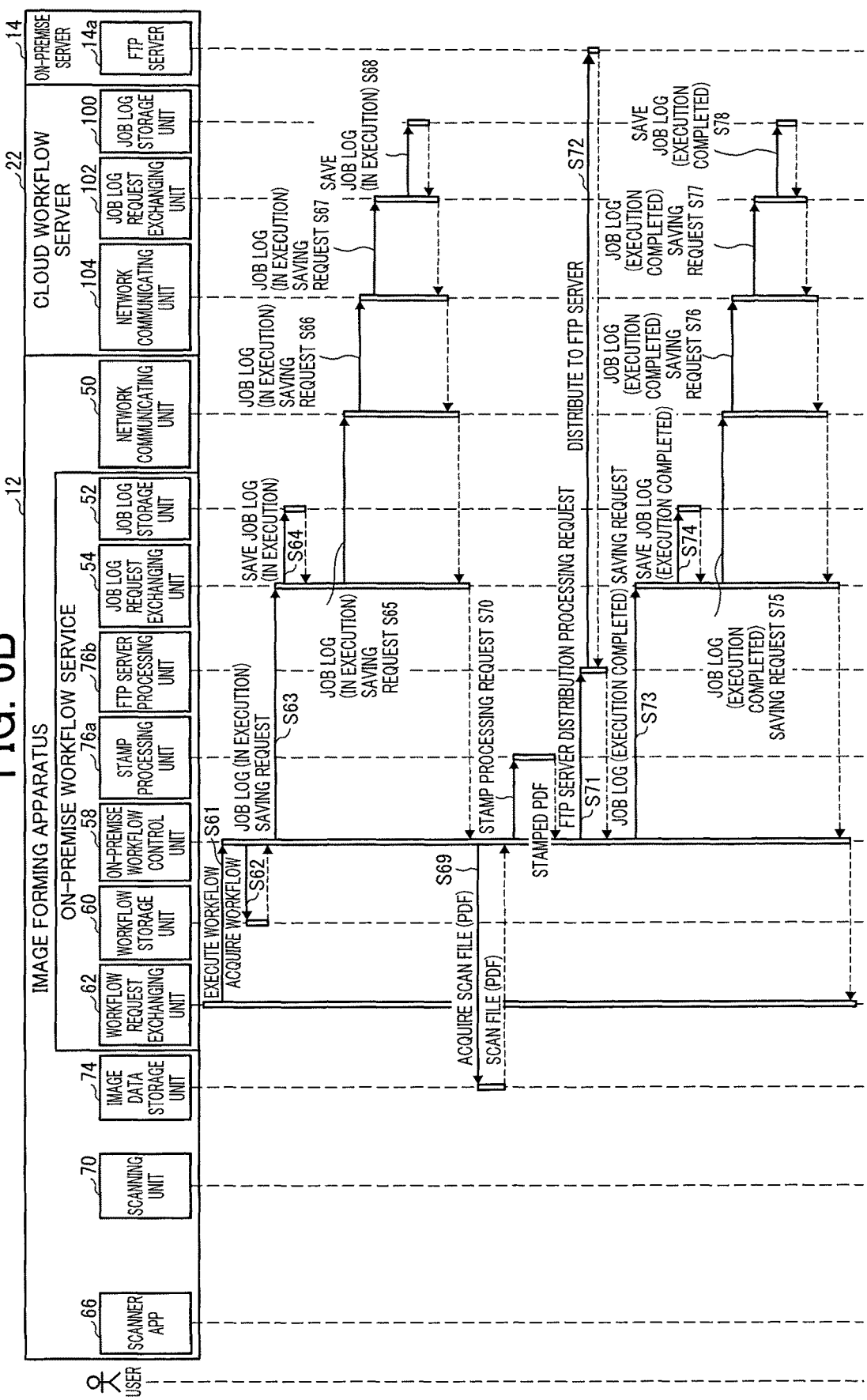
FIG. 6B is a sequence chart (2/2) of the other example of the workflow executed in the information processing system according to the first embodiment of the present disclosure.

FIG. 6A and FIG. 6B are sequence diagrams illustrating another example of executing a workflow performed by the information processing system 1 according to the first embodiment. FIG. 6A and FIG. 6B are the sequence diagrams of the case where a scan file is converted into a PDF file with a Bates stamp by the image forming apparatus 12 and transmitted to an FTP server 14a as an example of the on-premise server 14.

In step S51, the scanner application 66 accepts the scanning request from the user. The operation proceeds to step S52, and the scanner application 66 requests the scanning unit 70 to scan a document. The scanning unit 70 scans the document. In step S53, the scanning unit 70 stores the scan file in the image data storage unit 74.

In step S54, the scanner application 66 transmits the workflow execution request to the workflow request exchanging unit 62. The workflow execution request in step S54 includes the scan file, an on-premise workflow ID, the connection destination information, and the parameter used for the processing.

The operation proceeds to step S55, and the workflow request exchanging unit 62 requests the job log request exchanging unit 54 to save the job log of the execution request (the job) while designating the status "job accepted". The operation proceeds to step S56, and the job log request exchanging unit 54 saves the job log, which is requested by the workflow request exchanging unit 62, in the job log storage unit 52.

The operation proceeds to steps S57 to S59, and the job log request exchanging unit 54 requests the job log request exchanging unit 102 in the cloud workflow server 22 to save the job log while designating the status (the job accepted). The operation proceeds to step S60, and the job log request exchanging unit 102 saves the job log, which is requested by the job log request exchanging unit 54 in the image forming apparatus 12, in the job log storage unit 100.

As described above, since both of the job log of the on-premise workflow and the job log of the cloud workflow are saved in the job log storage unit 100 of the cloud workflow server 22 one by one, the job log of the on-premise workflow can be merged into the job log of the cloud workflow.

The operation proceeds to step S61, and the workflow request exchanging unit 62 requests the on-premise workflow control unit 58 to execute the workflow. The operation proceeds to step S62, and the on-premise workflow control unit 58 acquires the workflow information corresponding to the on-premise workflow ID from the workflow storage unit 60.

The operation proceeds to step S63, and the on-premise workflow control unit 58 requests the job log request exchanging unit 54 to save the status "in execution" of the job log. In step S64, on the basis of the saving request from the on-premise workflow control unit 58, the job log request exchanging unit 54 updates the corresponding status of the job log saved in the job log storage unit 52 to "in execution".

The operation proceeds to steps S65 to S67, and the job log request exchanging unit 54 requests the job log request exchanging unit 102 in the cloud workflow server 22 to save the status (in execution) of the job log. The operation proceeds to step S68, and, on the basis of the saving request from the job log request exchanging unit 54 in the image forming apparatus 12, the job log request exchanging unit 102 updates the corresponding status of the job log saved in the job log storage unit 100 to "in execution".

The operation proceeds to step S69, and the on-premise workflow control unit 58 acquires the scan file from the image data storage unit 74. In accordance with the workflow information acquired in step S62, the on-premise workflow control unit 58 sequentially executes the workflow processing.

The operation proceeds to step S70, and the on-premise workflow control unit 58 transmits a stamp processing request of the scan file to a stamp processing unit 76a, which is an example of the processing unit 76, and acquires a stamped PDF file.

The operation proceeds to step S71, and the on-premise workflow control unit 58 requests an FTP server distribution processing unit 76b, which is another example of the processing unit 76, to distribute the stamped PDF file to the FTP server 14a, which is the example of the on-premise server 14. The operation proceeds to step S72, and the FTP server distribution processing unit 76b distributes the stamped PDF file to the FTP server 14a.

When the job is completed, in step S73, the on-premise workflow control unit 58 requests the job log request exchanging unit 54 to save the status (execution completed) of the job log. In step S74, on the basis of the saving request from the on-premise workflow control unit 58, the job log request exchanging unit 54 updates the corresponding status of the job log saved in the job log storage unit 52 to "execution completed".

The operation proceeds to steps S75 to S77, and the job log request exchanging unit 54 requests the job log request exchanging unit 102 in the cloud workflow server 22 to save the status (execution completed) of the job log. The operation proceeds to step S78, and, on the basis of the saving request from the job log request exchanging unit 54 in the image forming apparatus 12, the job log request exchanging unit 102 updates the corresponding status of the job log saved in the job log storage unit 100 to "execution completed".

In the case where the error occurs during the workflow processing, the on-premise workflow control unit 58 stops the workflow processing and requests the job log request exchanging unit 54 to save the status (error) of the job log and to add the error information. On the basis of the saving request from the on-premise workflow control unit 58, the job log request exchanging unit 54 updates the corresponding status of the job log, which is saved in the job log storage units 52 and 100, to "error" and adds the error information.

The job log may be updated for each status of the processing unit 76 in addition to the status of the job (job accepted, in execution, execution completed, or error). In the case where the information of the job log other than the status is changed dynamically, such information other than the status may be updated or added.

Confirmation of Job Log:

After the execution of the workflow illustrated in one of FIG. 5 and a pair of FIG. 6A and FIG. 6B, a user can check the job log of corresponding one of the workflows by a procedure illustrated in FIG. 7. FIG. 7 is a sequence diagram illustrating an example of operation to check a job log.

In step S101, a user requests the job log display application 64 to check a job log. In steps S102 to S104, the job log display application 64 transmits a job log acquisition request to the job log request exchanging unit 102 in the cloud workflow server 22.

The operation proceeds to step S105, and the job log request exchanging unit 102 acquires the job log of the cloud workflow and the job log of the on-premise workflow from the job log storage unit 100, and transmits the job logs to the job log display application 64. The job log display application 64 displays the received job log of the cloud workflow and the received job log of the on-premise workflow. The job log of the cloud workflow and the job log of the on-premise workflow, which are received in the operation of the sequence diagram illustrated in FIG. 7, can be narrowed down by designating a user ID or the like.

FIG. 8 is an illustration of a table illustrating an example of a job log. The job log in FIG. 8 illustrates an example of the case where a scan file is transmitted to the cloud workflow server 22 and converted to the PDF file with a two-dimensional code and an OCR result, and where a job to transmit the PDF file with the two-dimensional code and the OCR result to the external cloud server 24 fails.

The job log in FIG. 8 includes the job information, the device information, the error information, the user information, the scanning job information, printing job information, and the like. The job information includes an ID of the job to be executed, a start date and time, a completion date and time, the workflow ID, a workflow name, a workflow type, an application ID, an application name, the status, one or more types of job detail information, and the like. The job detail information includes the status indicating a processing status of the respective processing.

The device information is information such as a device number of the image forming apparatus 12 that has executed at least one of the scanner application 66 and the printer application 68, and a browser name at the time of using a browser. The error information is error information when the job fails. When the job succeeds or is currently executed, this error information is not described. The user information is information on the user who executes at least one of the scanner application 66 and the printer application 68. The scanning job information is information on the color, document size, and the like when the image forming apparatus 12 scans the document. When the document is printed, such scanning information is not described. The printing job information is information on the color, paper size, and the like when the image forming apparatus 12 prints the document. When the document is scanned, such printing job information is not described.

FIG. 9A and FIG. 9B are illustrations of an example of screens displayed by the job log display application. FIG. 9A illustrates an example of a user-specific list screen displayed by the job log display application 64. In the user-specific list screen, a list of the job logs is displayed per user, and representative values of each of the job logs are displayed. When selecting one of the job logs from the list of job logs, for example, the user can display a job log detail screen illustrated in FIG. 9B. FIG. 9B illustrates an example of the job log detail screen displayed by the job log display application 64. The job log detail screen displays the information on the job log that includes a cause of the error, the status of each of the processing, and the like and is more detailed than the user-specific list screen in FIG. 9A. The screen displayed by the job log display application 64 may be one screen or may include a plurality of screens that are switched for each execution environment or each of the users.

According to the present embodiment, the user can collectively display the job log of the cloud workflow and the job log of the on-premise workflow by the job log display application 64.

Second Embodiment:

In the first embodiment, the image forming apparatus 12 may not be able to access the cloud workflow server 22 due to a connection error of the network 30 or the like. Thus, in a second embodiment, when the image forming apparatus 12 cannot access the cloud workflow server 22, the job log display application 64 of the image forming apparatus 12 acquires and displays the job log of the on-premise workflow stored in the job log storage unit 52 of the image forming apparatus 12.

In addition, in the case where the job log display application 64 is a web application, and the image forming apparatus 12 cannot access the cloud workflow server 22, the job log display application 64 does not acquire screen data (such as Hypertext Markup Language (HTML) data) and does not display the screen. Thus, in the second embodiment, in the case where the image forming apparatus 12 cannot access the cloud workflow server 22, the job log display application 64 of the image forming apparatus 12 uses the screen data stored in the image forming apparatus 12.

Figure 10:
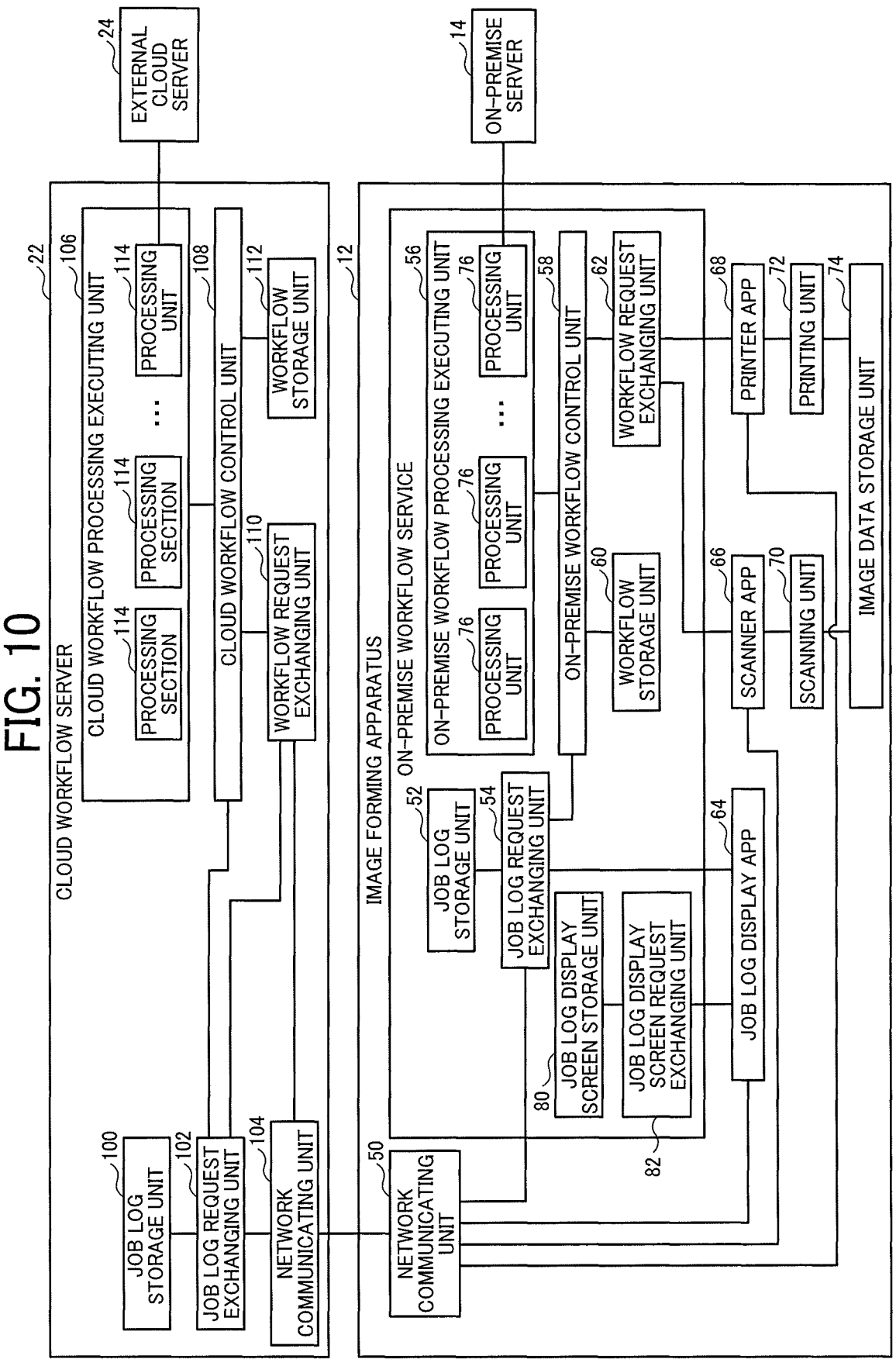
FIG. 10 is a functional configuration diagram of an example of an information processing system according to a second embodiment of the present disclosure.

The second embodiment is the same as the first embodiment except for a part of the first embodiment. Thus, the description on the second embodiment will appropriately be omitted. FIG. 10 is a block diagram illustrating an example of a functional configuration of the information processing system 1 according to the second embodiment. The functional configuration diagram of FIG. 10 illustrates such a configuration that the job log display application 64 is an example of a web application and that a job log display screen storage unit 80 and a job log display screen request exchanging unit 82 are added to the functional block diagram of FIG. 4.

The job log display screen storage unit 80 stores the screen data used by the job log display application 64. The job log display screen request exchanging unit 82 accepts a job log display screen acquisition request and transmits the screen data to a request source of the job log display screen acquisition request.

Figure 11A:
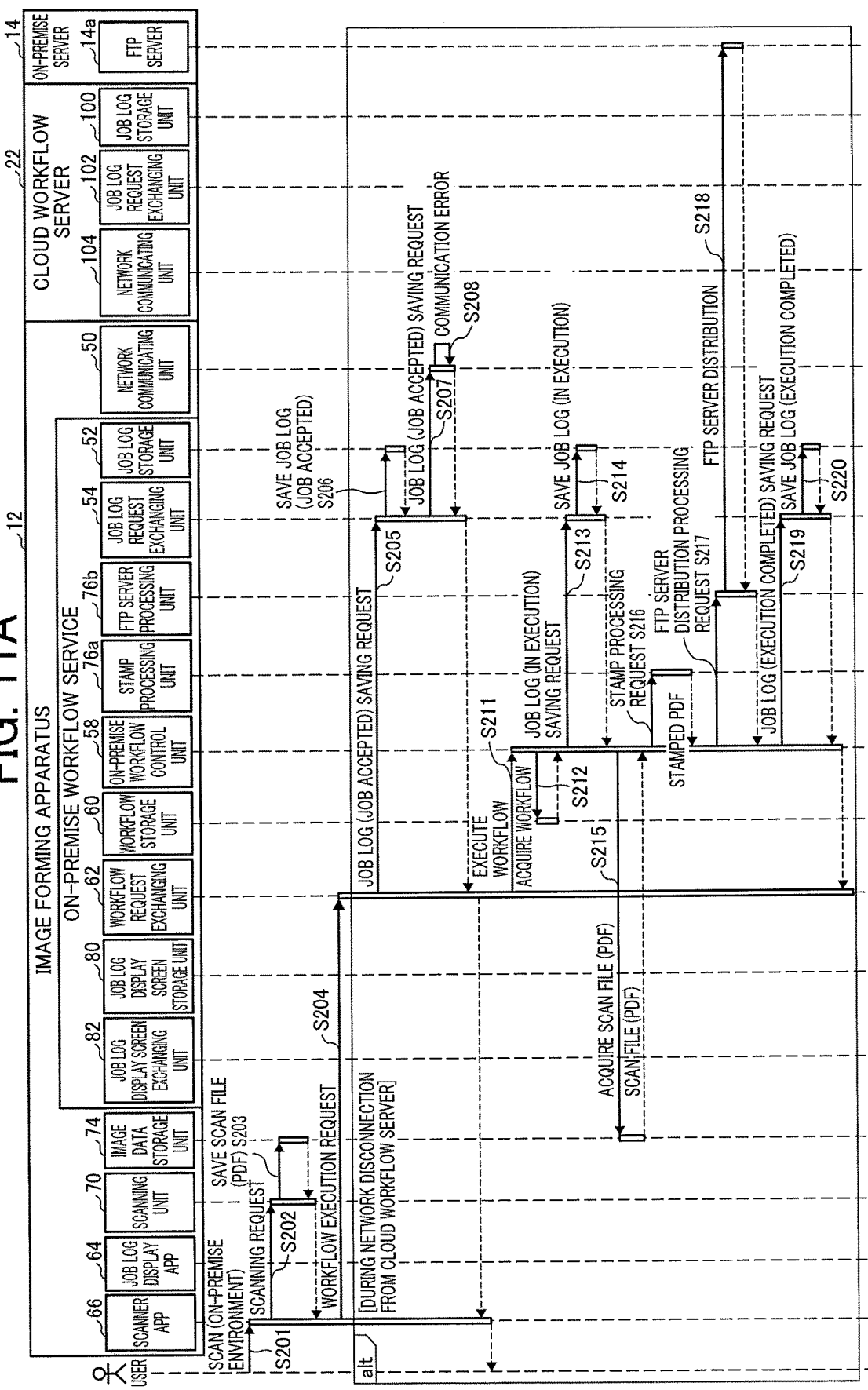
FIG. 11A is a sequence chart (1/2) of an example of a workflow executed in the information processing system according to the second embodiment of the present disclosure.

FIG. 11A and FIG. 11B are sequence charts of an example of the workflow executed in the information processing system according to the second embodiment. The processing in steps S201 to S206 in FIG. 11A is the same as the processing in steps S51 to S56 in FIG. 6A.

In steps S207 to S208, the job log request exchanging unit 54 requests the job log request exchanging unit 102 in the cloud workflow server 22 to save the job log while designating the status (the job accepted). However, since the second embodiment is about the case where the image forming apparatus 12 do not access the cloud workflow server 22, a communication error occurs, and the job log of the on-premise workflow are not saved in the cloud workflow server 22.

Thus, in steps S211 to S220, the processing in FIG. 6B other than the processing in steps S65 to S68 and S75 to S78, which requires the communication with the cloud workflow server 22, is executed.

The processing in step S221 onward is processing to confirm the job log of the executed workflow. In step S221, the user requests the job log display application 64 to confirm the job log. In the case where the job log display application 64 is a web application, the job log display application 64 executes the processing in steps S222 to S223.

In step S222, the job log display application 64 transmits the job log display screen acquisition request to the job log display screen request exchanging unit 82. The operation proceeds to step S223, and the job log display screen request exchanging unit 82 acquires the screen data to be used by the job log display application 64 from the job log display screen storage unit 80, and transmits the screen data to the job log display application 64. In the case where the job log display application 64 is a web application, the job log display application 64 executes the processes of steps S222 to S223 and thereafter executes the processes of step S224 and subsequent steps. In the case where the job log display application 64 is not a web application, the job log display application 64 executes the process of step S221 and thereafter executes the processes of step S224 and subsequent steps.

In step S224, the job log display application 64 transmits the job log acquisition request to the job log request exchanging unit 54. The operation proceeds to step S225, and the job log request exchanging unit 54 acquires the job log of the on-premise workflow from the job log storage unit 52 in the image forming apparatus 12, and transmits the job log of the on-premise workflow to the job log display application 64.

According to the present embodiment, even in the case where the image forming apparatus 12 cannot access the cloud workflow server 22 due to the connection error of the network 30 or the like, the job log of the on-premise workflow, which is stored in the job log storage unit 52 of the image forming apparatus 12, can be acquired and displayed.

Third Embodiment:

In the second embodiment, the job log of the on-premise workflow is not saved in the cloud workflow server 22 due to the connection error of the network 30 or the like. However, the connection error of the network 30 may be resolved at the time of checking the job log. In addition, in the second embodiment, even in the case where the connection error of the network 30 is not resolved, the job log can remain in a cache of the job log display application 64.

Thus, in a third embodiment, the job log, which is not transmitted to the cloud workflow server 22 due to the connection error of the network 30 or the like, the job log saved in the cloud workflow server 22, and the job log in a cache (a job log display application cache 90) of the job log display application 64 are merged and displayed by the job log display application 64.

In the case where the connection error of the network 30 is not resolved, and the job log display application 64 is a web application, similar to the second embodiment, the job log display application 64 can use the display screen stored in the image forming apparatus 12.

Figure 12:
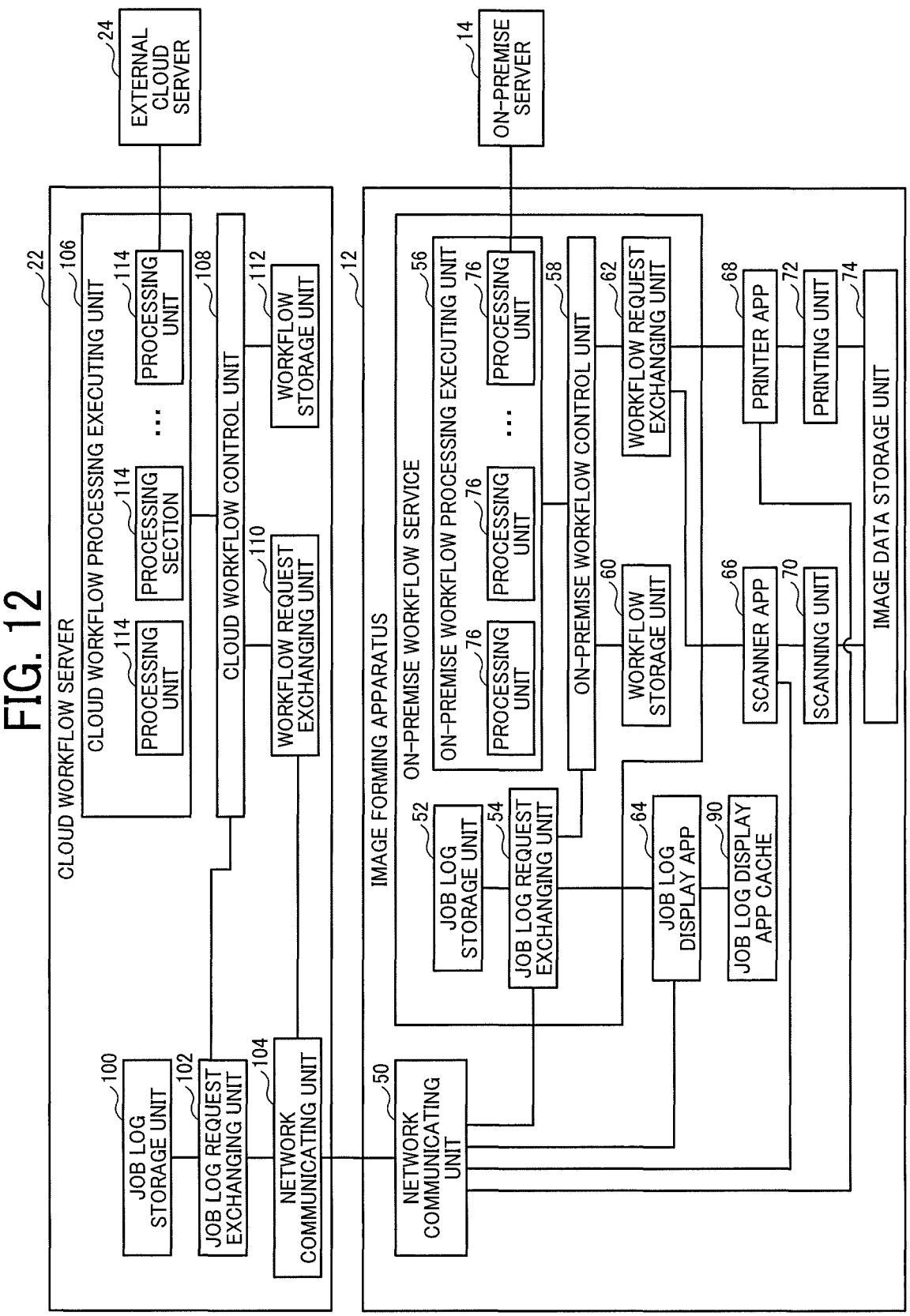
FIG. 12 is a functional configuration diagram of an example of an information processing system according to a third embodiment of the present disclosure.

Since the third embodiment is the same as at least one of the first and second embodiments except for a part of at least one of the first and second embodiments, the description on the third embodiment will appropriately be omitted. FIG. 12 is a block diagram illustrating an example of a functional configuration of the information processing system 1 according to the third embodiment. The functional configuration diagram of FIG. 12 illustrates such a configuration that the job log display application cache 90 is added to the configuration illustrated in the functional configuration diagram of FIG. 4. The job log display application cache 90 temporarily stores the acquired job log.

Figure 13A:
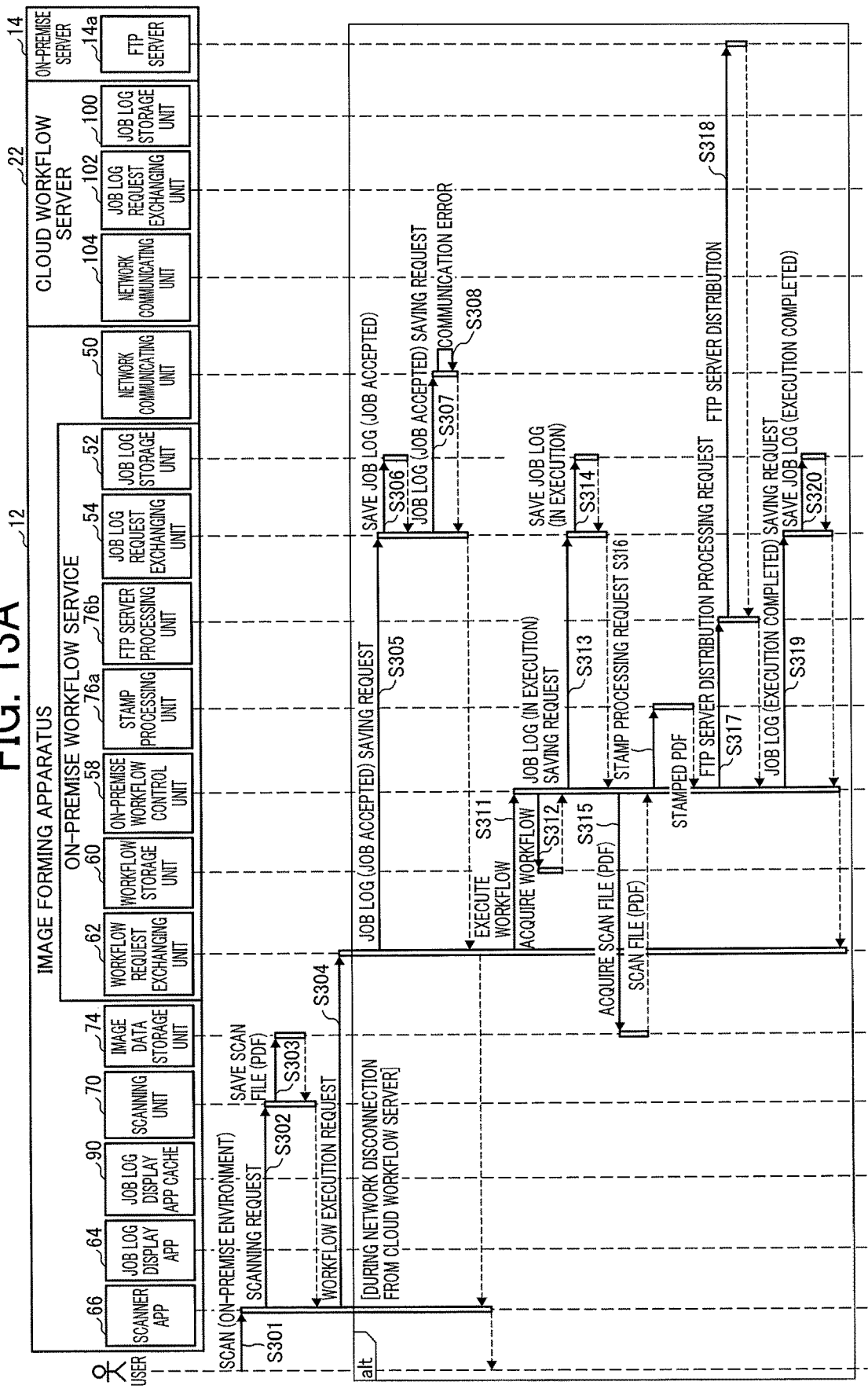
FIG. 13A is a sequence chart (1/2) of an example of a workflow executed in the information processing system according to the third embodiment of the present disclosure.
Figure 13B:
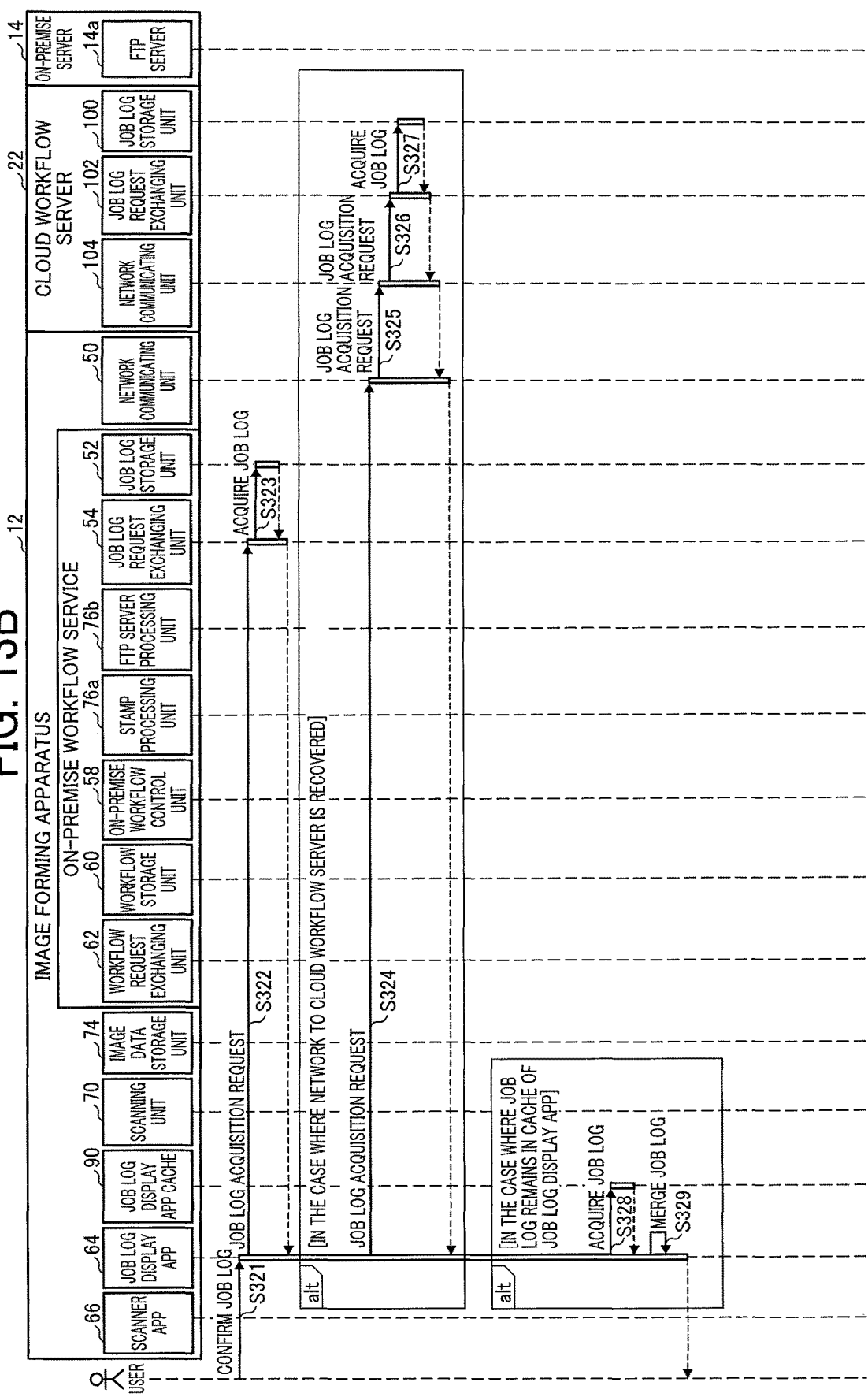
FIG. 13B is a sequence chart (2/2) of the example of the workflow executed in the information processing system according to the third embodiment of the present disclosure.

FIG. 13A and FIG. 13B are sequence charts of an example of the workflow executed in the information processing system according to the third embodiment. Processing in steps S301 to S320 in FIG. 13A is the same as the processing in steps S201 to S220 in FIG. 11A.

Processing in step S321 onward is processing to confirm the job log of the executed workflow. In step S321, the user requests the job log display application 64 to confirm the job log.

In step S322, the job log display application 64 transmits the job log acquisition request to the job log request exchanging unit 54. The operation proceeds to step S323, and the job log request exchanging unit 54 acquires the job log of the on-premise workflow from the job log storage unit 52 in the image forming apparatus 12, and transmits the job log of the on-premise workflow to the job log display application 64.

In the case where the connection error of the network 30 is resolved, the job log display application 64 acquires the job log of the cloud workflow and the job log of the on-premise workflow, which are saved in the job log storage unit 100, from the cloud workflow server 22 by the processes of steps S324 to S327.

In the case where the job log is stored in the job log display application cache 90, the job log display application 64 acquires the job log from the job log display application cache 90 in step S328. Then, of the job logs acquired by the processes of steps S322 to S328, job logs having duplicated job IDs, are merged and displayed by the job log display application 64, as describe below.

Figure 14:
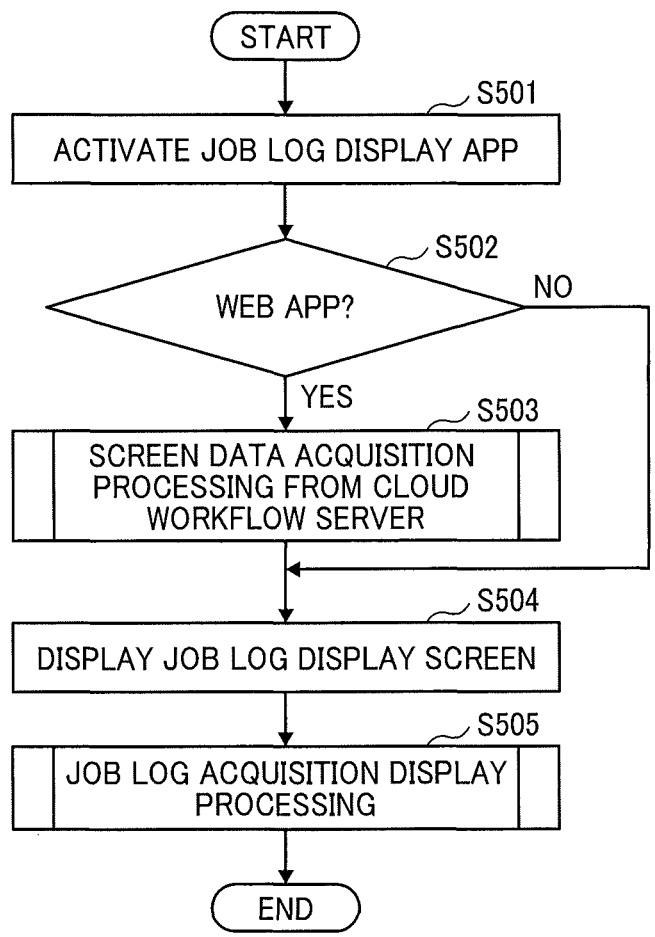
FIG. 14 is a flowchart of an example of processing by the job log display application according to the embodiments of the present disclosure.

In the first to third embodiments, the job log display application 64 displays the screen as illustrated in FIG. 9 by a procedure in FIG. 14 to FIG. 16, for example. FIG. 14 is a flowchart illustrating an example of an operation by the job log display application 64.

In step S501, and the job log display application 64 is activated. The operation proceeds to step S502, and when the job log display application 64 is a web application, the screen data acquisition processing from the cloud workflow server 22 is executed in step S503. When the job log display application is not a web application, the process of step S503 is skipped. The screen data acquisition process in step S503 will be described in detail later. The operation proceeds to step S504, and the job log display application 64 displays the screen (the job log display screen) by using the screen data. The operation proceeds to step S505, and the job log display application 64 executes a job log acquisition display process and updates the job log display screen displayed in step S504 to reflect a result of the job log acquisition display process. The job log acquisition display process in step S505 will be described in detail later.

FIG. 15 is a flowchart illustrating an example of the screen data acquisition process. In step S511, the job log display application 64 attempts to acquire the screen data of the job log display screen from the cloud workflow server 22. If the acquisition of the screen data is succeeded, the job log display application 64 terminates the operation in the flowchart illustrated in FIG. 15. On the other hand, if the acquisition of the screen data is failed, the operation proceeds to step S513, and the job log display application 64 attempts to acquire the screen data of the job log display screen from the job log display screen storage unit 80. If the acquisition of the screen data is succeeded in step S513, the job log display application 64 terminates the operation in the flowchart illustrated in FIG. 15. If the acquisition of the screen data is failed, the job log display application 64 displays an error notification.

FIG. 16 is a flowchart illustrating an example of the job log acquisition display process. In step S521, the job log display application 64 attempts to acquire the job log from the cloud workflow server 22.

If the acquisition of the job log from the cloud workflow server 22 is succeeded, the operation proceeds to step S523, and the job log display application 64 determines whether the job log not transmitted to the cloud workflow server 22 remains in the image forming apparatus 12.

If the job log not transmitted to the cloud workflow server 22 remains in the image forming apparatus 12, the operation proceeds to step S524, and the job log display application 64 attempts to acquire the job log that is not transmitted to the cloud workflow server 22 and remains in the image forming apparatus 12.

If the acquisition of the job log is succeeded in step S524, the operation proceeds to step S526, and the job log display application 64 merges the job log, which is acquired from the cloud workflow server 22 in step S521, and the job log, which is not transmitted to the cloud workflow server 22 and is acquired in step S524. The operation proceeds to step S527, and the job log display application 64 displays the job log that is merged in step S526 (all the latest job log).

On the other hand, if the acquisition of the job log is failed in step S524, the operation proceeds to step S528, and the job log display application 64 displays the job log (possibly the partially old job log) acquired from the cloud workflow server 22 in step S521. In step S523, if the job log not transmitted to the cloud workflow server 22 does not remain in the image forming apparatus 12, the operation proceeds to step S529. The job log display application 64 displays the job log (all the latest job log) acquired from the cloud workflow server 22 in step S521.

If the acquisition of the job log from the cloud workflow server 22 is failed, the operation proceeds to step S530, and the job log display application 64 determines whether the job log at the time of the last activation remains in the job log display application cache 90.

If the job log at the time of the last activation remains in the job log display application cache 90, the operation proceeds to step S531. In step S531, the job log display application 64 acquires the job log from the job log display application cache 90.

The operation proceeds to step S532, and the job log display application 64 determines whether the job log not transmitted to the cloud workflow server 22 remains in the image forming apparatus 12.

If the job log not transmitted to the cloud workflow server 22 remains in the image forming apparatus 12, the operation proceeds to step S533, and the job log display application 64 attempts to acquire the job log that is not transmitted to the cloud workflow server 22 and remains in the image forming apparatus 12.

If the acquisition of the job log is succeeded in step S533, the operation proceeds to step S535, and the job log display application 64 merges the job log, which is acquired from the job log display application cache 90 in step S531, and the job log, which is not transmitted to the cloud workflow server 22 and is acquired in step S533. The operation proceeds to step S536, and the job log display application 64 displays the job log (possibly the partially old job log) merged in step S535.

On the other hand, if the acquisition of the job log is failed in step S533, the operation proceeds to step S537, and the job log display application 64 displays the job log (possibly the partially old job log) acquired from the job log display application cache 90 in step S531.

In step S532, if the job log not transmitted to the cloud workflow server 22 does not remain in the image forming apparatus 12, the operation proceeds to step S538. The job log display application 64 displays the job log (possibly the partially old job log) acquired from the job log display application cache 90 in step S531.

On the other hand, if the job log at the time of the last activation does not remains in the job log display application cache 90, the operation proceeds to step S539. The job log display application 64 determines whether the job log not transmitted to the cloud workflow server 22 remains in the image forming apparatus 12.

If the job log not transmitted to the cloud workflow server 22 remains in the image forming apparatus 12, the operation proceeds to step S540, and the job log display application 64 attempts to acquire the job log that is not transmitted to the cloud workflow server 22 and remains in the image forming apparatus 12.

If the acquisition of the job log is succeeded in step S540, the operation proceeds to step S542, and the job log display application 64 displays the job log that is not transmitted to the cloud workflow server 22 and is acquired in step S540.

On the other hand, if the acquisition of the job log is failed in step S540, the job log display application 64 displays the error. Meanwhile, in step S539, if the job log not transmitted to the cloud workflow server 22 does not remain in the image forming apparatus 12, the job log display application 64 displays the error.

As described heretofore, according to the present embodiment, the image forming apparatus 12, which is communicably connected to the cloud workflow server 22 for managing the job log in the cloud environment 20 and is also connected to the user environment 10, can notify the cloud workflow server 22 of the job log in the user environment 10. In addition, according to the present embodiment, the cloud workflow server 22 can provide the image forming apparatus 12 with the job log of the cloud workflow and the job log of the on-premise workflow. Thus, the image forming apparatus 12 can collectively display the job logs of the workflows executed in the different environments.

The present disclosure is not limited to the embodiments that are specifically disclosed above, and various modifications and changes can be made to the present disclosure without departing from the scope of the claims. For example, the configuration of the information processing system 1 illustrated in FIG. 1 is merely an example. The cloud workflow server 22 may be divided into and implemented by a plurality of information processing apparatus. The image forming apparatus 12 may be configured to include a plurality of devices such as a device functioning as an operation unit and a device functioning as a main body unit.

According to a conventional technique, when collectively display log information of workflows executed in a user environment such an on-premises environment and a service provision environment such as on the Internet, one can consider that the log information is to be managed in the service provision environment, for example. However, if the log information is collective managed in the service provision environment, the service provision environment cannot manage the log information that cannot be acquired from the user environment. Thus, according to a conventional technique, in a case where the log information is collectively managed in the service provision environment such as the Internet, which is different the user environment, the log information of the workflow executed in the different environment is not collectively displayed.

According to one or more embodiments of the present disclosure, the log information of the workflows executed in the different networks can collectively be displayed.

Any one of the above-described operations may be performed in various other ways, for example, in an order different from the one described above.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing system, comprising:
   a first information processing apparatus connected to a first network and executing a first workflow;
   a second information processing apparatus connected to a second network and executing a second workflow that is different from the first workflow, the second network being different from the first network; and
   a third information processing apparatus connected to the second network and executing the second workflow in cooperation with the second information processing apparatus,
   the information processing system comprising circuitry configured to
      store, in a first memory of the first information processing apparatus, log information of the first workflow executed by the first information processing apparatus and log information of the second workflow executed by the second information processing apparatus and the third information processing apparatus, the log information of the second workflow being transmitted from the second information processing apparatus;
      store, in a second memory of the second information processing apparatus, the log information of the second workflow executed by the second information processing apparatus and the third information processing apparatus; and
      display a log information display screen on the second information processing apparatus, the log information display screen being generated by using at least one of the log information of the second workflow stored in the second memory of the second information processing apparatus and a pair of the log information of the first workflow and the log information of the second workflow stored in the first memory of the first information processing apparatus, wherein
      when the circuitry successfully acquires the log information of the first workflow and the log information of the second workflow from the first memory of the first information processing apparatus, the circuitry is further configured to display, on the second information processing apparatus, the log information display screen that is generated by using the log information of the first workflow and the log information of the second workflow acquired from the first memory of the first information processing apparatus.

2. The information processing system according to claim 1, wherein when the log information of the second workflow not transmitted to the first information processing apparatus remains in the second information processing apparatus, the circuitry is further configured to display the log information display screen by merging the log information of the first workflow and the log information of the second workflow, which are acquired from the first memory of the first information processing apparatus, with the log information of the second workflow not transmitted to the first information processing apparatus.

3. The information processing system according to claim 1, wherein when the circuitry fails in acquisition of the log information of the first workflow and the log information of the second workflow from the first memory of the first information processing apparatus, the circuitry is further configured to display, on the second information processing apparatus, the log information display screen, which is generated by using the log information of the second workflow acquired from the second memory of the second information processing apparatus.

4. The information processing system according to claim 3, wherein the circuitry is further configured to execute a cache function to generate the log information display screen by using the log information that has been used to generate the log information display screen, when the log information that has been used to generate the log information display screen remains due to the cache function.

5. The information processing system according to claim 4, wherein when the log information of the second workflow not transmitted to the first information processing apparatus remains in the second information processing apparatus, the circuitry is further configured to generate the log information display screen by merging the log information, which remains due to the cache function and has been used to generate the log information display screen, with the log information of the second workflow not transmitted to the first information processing apparatus.

6. The information processing system according to claim 1, wherein when the circuitry attempts to acquire screen data of the log information display screen from the first information processing apparatus to generate the log information display screen, but fails in acquisition of the screen data from the first information processing apparatus, the circuitry is further configured to generate the log information display screen by using screen data of the log information display screen stored in the second information processing apparatus.

7. An information processing apparatus connected to a first network that is different from a second network to which a first information processing apparatus for executing a first workflow is connected, the information processing apparatus executing a second workflow in cooperation with another information processing apparatus connected to the first network, the information processing apparatus comprising:
   circuitry to:
      request the first information processing apparatus, which saves log information of the first workflow, to save log information of the second workflow executed in cooperation with the another information processing apparatus;

store the log information of the second workflow executed in cooperation with the another information processing apparatus; and display a log information display screen generated by using at least one of the log information of the second workflow stored in the information processing apparatus and a pair of the log information of the first workflow and the log information of the second workflow, the pair being saved in the first information processing apparatus, wherein when the circuitry successfully acquires the log information of the first workflow and the log information of the second workflow from the first information processing apparatus, the circuitry is further configured to display the log information display screen that is generated by using the log information of the first workflow and the log information of the second workflow acquired from the first information processing apparatus.

8. A non-transitory computer-readable storage medium storing a computer-readable program that causes an information processing apparatus connected to a first network that is different from a second network to which a first information processing apparatus for executing a first workflow is connected, the information processing apparatus executing a second workflow in cooperation with another information processing apparatus connected to the first network, to perform a method comprising:

requesting the first information processing apparatus, which saves log information of the first workflow, to save log information of the second workflow executed in cooperation with the another information processing apparatus;

storing the log information of the second workflow executed in cooperation with the another information processing apparatus; and displaying a log information display screen generated by using at least one of the log information of the second workflow stored in the information processing apparatus and a pair of the log information of the first workflow and the log information of the second workflow, the pair being saved in the first information processing apparatus, wherein when the circuitry successfully acquires the log information of the first workflow and the log information of the second workflow from the first information processing apparatus, the circuitry is further configured to display the log information display screen that is generated by using the log information of the first workflow and the log information of the second workflow acquired from the first information processing apparatus.

* * * * *